(12) United States Patent
Farmer et al.

(10) Patent No.: US 12,202,395 B1
(45) Date of Patent: Jan. 21, 2025

(54) FOLDING CONVERTIBLE RAMP BODY FOR USE WITH VEHICLES, A COMBINATION VEHICLE AND FOLDING CONVERTIBLE RAMP BODY, AND/OR A DEVICE FOR LOADING ROLLING TOOLS INTO A VEHICLE USING A FOLDING CONVERTIBLE RAMP BODY

(71) Applicants: Wyatt Taft Farmer, Cavetown, MD (US); Luke Waesche, Sabillasville, MD (US)

(72) Inventors: Wyatt Taft Farmer, Cavetown, MD (US); Luke Waesche, Sabillasville, MD (US)

( * ) Notice: Subject to any disclaimer, the term of this patent is extended or adjusted under 35 U.S.C. 154(b) by 168 days.

(21) Appl. No.: 17/895,836

(22) Filed: Aug. 25, 2022

Related U.S. Application Data

(60) Provisional application No. 63/237,882, filed on Aug. 27, 2021.

(51) Int. Cl.
*B60P 1/43* (2006.01)

(52) U.S. Cl.
CPC ................................. *B60P 1/435* (2013.01)

(58) Field of Classification Search
CPC ....................................................... B60P 1/435
See application file for complete search history.

(56) References Cited

U.S. PATENT DOCUMENTS

| | | | | |
|---|---|---|---|---|
| 6,533,337 | B1 * | 3/2003 | Harshman | B60P 3/07 224/403 |
| 8,894,345 | B1 * | 11/2014 | Richins | B60P 3/122 414/537 |
| 2016/0137117 | A1 * | 5/2016 | Parrish | B60P 1/435 414/537 |
| 2017/0088372 | A1 * | 3/2017 | Breeden, III | B65G 69/30 |

* cited by examiner

*Primary Examiner* — Saul Rodriguez
*Assistant Examiner* — Lucia Elba Rodriguez
(74) *Attorney, Agent, or Firm* — GARCIA-ZAMOR INTELLECTUAL PROPERTY LAW, LLC; Ruy Garcia-Zamor

(57) ABSTRACT

A folding convertible ramp body for use with vehicles, specifically sport utility vehicles, vans, and/or trucks. A combination vehicle and folding convertible ramp body for loading and/or unloading objects into said vehicle. A device for loading rolling tools into a vehicle using a folding convertible ramp body that may be retrofitted onto the vehicle.

19 Claims, 27 Drawing Sheets

FOLDING CONVERTIBLE RAMP BODY FOR USE WITH VEHICLES, A COMBINATION VEHICLE AND FOLDING CONVERTIBLE RAMP BODY, AND/OR A DEVICE FOR LOADING ROLLING TOOLS INTO A VEHICLE USING A FOLDING CONVERTIBLE RAMP BODY

CROSS-REFERENCE TO RELATED APPLICATIONS

This application claims priority to and benefit of U.S. Provisional Patent Application 63/237,882, filed Aug. 27, 2021, which is hereby incorporated by reference in its entirety as if fully set forth herein.

BACKGROUND

The present invention relates generally to vehicle attachments. More specifically the preferred embodiments of the present invention relate to a system for attaching a convertible ramp body to a vehicle to facilitate in the loading, transport, and storage of equipment in the cargo bed said vehicle.

It may be advantageous to provide a convertible ramp body system and/or device but not necessarily, having at least one of: a structure which may allow for the attachment of a device to a vehicle having at least a first closed position wherein objects stored in the vehicle cargo bed are secured, and a second open position configured to facilitate the transfer of objects to and from the vehicle; provide an improved device for securing objects in a vehicle cargo; provide an improved device for transporting objects from outside the vehicle cargo bed to the vehicle cargo bed; provide an improved device for transporting objects from inside the vehicle cargo bed to outside the vehicle cargo bed; provide an improved device for locking or otherwise securing a convertible ramp device in a first closed position such that it can be easily manipulated into a second open position and vice versa without risk of unintended position changes; provide an improved device for transporting at least one of, large objects, and a large number of small objects, from one location to another location in a vehicle; is efficient to manufacture; easy to use; aesthetically pleasing; and easy to install and/or uninstall.

SUMMARY

Briefly speaking, one aspect of the present invention is directed to a combination of a vehicle and a folding convertible ramp body, wherein the vehicle has a cargo bed against which the folding convertible ramp body may be engaged. The convertible ramp body may have a cargo bed extender positioned adjacent to the cargo bed which extends its usable area. The folding ramp portion of the convertible ramp body may be connected to the cargo bed extender by a first axis of rotation to allow the ramp to rotate upward and downward there about and may fold out from within itself along a secondary axis of rotation.

In a separate aspect, the present invention is directed to a combination of a vehicle and a folding convertible ramp body, wherein the vehicle has a cargo bed about which the convertible ramp body may be positioned. The cargo bed preferably has a bed floor with a perimeter. The convertible ramp body may have a cargo bed extender positioned adjacent to the cargo bed and ramp connected to the cargo bed extender by a first pivotal connection to allow the folding ramp to rotate upward and downward there about. The folding convertible ramp body may be further configured to fold out from itself along a second pivotal connection such that two ramp portions can be stored in the same vertical space while the ramp is not deployed. The cargo bed extender may be configured to increase an effective area of the cargo bed of the vehicle. When viewed in cross-section the support panel may have an arcuate curvature, one of the support panel ends being vertically closer to the ground than the other support panel end which is generally positioned a same vertical distance above the ground as the cargo bed of the vehicle.

In some aspects, the folding convertible ramp body may be configured to increase effective area of a cargo bed of a vehicle while simultaneously serving the function of a tailgate of the vehicle which may be removed during the installation of the folding convertible ramp body. Preferably the device has a first closed position and a second open position, between which the device may be converted through the application of manual force. Preferably the device may be kept in the first closed position, therein serving the function of the tailgate of the vehicle, by a pair of locking mechanisms located at the sides of the device. Preferably, these mechanisms may be manipulated from a first locked position to a second unlocked position through the application of manual force to locking bars located thereon. These locking mechanisms may be automatically converted to a primed state during the conversion of the device from the first closed position to the second open position such that when the device is moved back from the second open position to the first closed position the locking mechanisms automatically return the first locked position.

In a separate aspect, the invention may be directed to a folding convertible ramp body configured to allow the ramp to rotate upward and downward about a first and second pivotal connections such that the ramp is moveable between a first closed position in which the ramp forms a gate for an end of the expanded cargo bed, and a second open position in which the distal end of ramp contacts a support surface, such as the ground. When in the open position, or ground contacting position, the ramp can be positionally fixed relative to the vehicle bed extender such that the ramp forms at least one support structure for the cargo bed. The support panel of the cargo bed extender, wherein when viewed in cross-section, may have an arcuate curvature, with a distal end being closer to the transfer surface than the proximal end which is generally positioned a same vertical distance above the support surface as the cargo bed of the vehicle. Preferably, the height of the vehicle bed extender may be generally unchanged whether the device is something which is not in the first closed position or the second open position.

A separate aspect of the present invention is directed to a pair of interlocking, folding ramp portions which are configured to have major surfaces which join with one another and the vehicle bed extender when the device is in the second open position to form one continuous curved ramp surface extending from the support surface to the vehicle bed to facilitate the transfer of objects to and from the vehicle bed. Preferably, when the device is in the first closed position the first ramp portion is connected to the vehicle bed extender at a first axis of rotation which is located at the proximal end of the first ramp section and the distal of the vehicle bed extender. The first ramp portion may be connected to the second ramp portion along the second axis of rotation which is located at the distal end of the first ramp portion and the proximal end of the second ramp portion. Preferably when the device is in the second open position, the distal end of the second ramp portion contacts the ground. Preferably when the device is in the first closed position the normals to the first and second ramp portions, are oriented generally away from one another and the major surface of the first ramp portion forms the inside wall of the perimeter of the rear of the vehicle bed, while the major surface of the second ramp portion forms the outside wall of the perimeter of the rear of the vehicle bed.

In a separate aspect, the present invention may be directed to a combination vehicle and a folding convertible cargo bed extender. The vehicle may include a cargo bed which includes a bed floor with a perimeter. The convertible ramp body may include a cargo bed extender that can be positioned generally adjacent to a rear edge of the cargo bed to increase the effective area of the vehicle cargo bed. A ramp may be connected to the cargo bed extender so as to rotate upward and downward.

In a separate aspect, the present invention may be directed to a combination vehicle and folding convertible cargo bed extender. The vehicle may include a cargo bed which includes a bed with a perimeter. The convertible ramp body may include a cargo bed extender that can be positioned generally adjacent to a rear edge of the cargo bed to increase the effective area of the vehicle cargo bed.

In a separate aspect, the present invention may be directed to a folding ramp device configured for use with a vehicle having a vehicle bed, the folding ramp device, comprising, a mechanism for extending the usable space of the vehicle bed. Preferably this vehicle bed extender is engaged with the vehicle and has a major surface that is oriented generally away from the ground such that objects can be placed thereon. Preferably, the vehicle bed extender is connected to a ramp body which may be comprised of the first ramp section and a second ramp section which together can fold up into a first closed position, and fold down into a second closed position. In the first closed position, preferably these two ramp portions have major surfaces that face away from each other. In the second open position, preferably these two ramp portions have major services that join to form one continuous surface. Preferably this continuous surface generally takes the form of an S-shape when viewed in cross-section. This may occur when the first ramp section is configured to be convex and extending away from the ground and the second ramp section is configured to be concave and opening away from the ground.

In a separate aspect, the present invention may be directed to a folding ramp device which is configured to engage with the vehicle hitch such that any torsional force applied to the body of the ramp device is resisted by the hitch attachment contacting the hitch. Preferably, this prevents any torsional force attempting to pivot the chassis major surface away from the vehicle bed, from doing so. The present invention may also be directed towards a support mechanism disposed on the chassis and configured to contact a side of the vehicle bumper of the vehicle generally opposite from the vehicle hitch when the folding device is engaged with the vehicle hitch. This support mechanism may therefore facilitate both in the transfer of force from the device to the vehicle and prevent damage to the vehicle.

In a separate aspect, the present invention may be directed to a folding ramp device onto which at least one biasing member is disposed and configured to act against gravitational force on the ramp body during movement between the first closed position and a second extended position. This biasing member may therefore facilitate in manual transference of the device from a first closed position to a second extended position.

In a separate aspect, the present invention may be directed to a folding ramp device comprising a plurality of side panels attached to the chassis which extends towards the sides of the vehicle bed and prevent objects contained therein from falling out of the vehicle during transport.

In a separate aspect, the present invention may be directed to a folding ramp device which is configured to engage with a vehicle hitch. A portion of the ramp device which engages with the vehicle hitch may be a hitch insert which is configured have an elongated passage therethrough which may receive a hitch pin passed through the vehicle hitch and the hitch insert. Preferably the hitch insert is configured to be telescopically withdrawn inwardly inside the vehicle through the application of force onto a tension bolt which itself is configured to have a bolt eye that also accepts a hitch pin.

BRIEF DESCRIPTION OF THE DRAWINGS

The foregoing summary, as well as the following detailed description of the preferred embodiments of the present invention will be better understood when read in conjunction with the appended drawings. For the purposes of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings.

Figure 1:
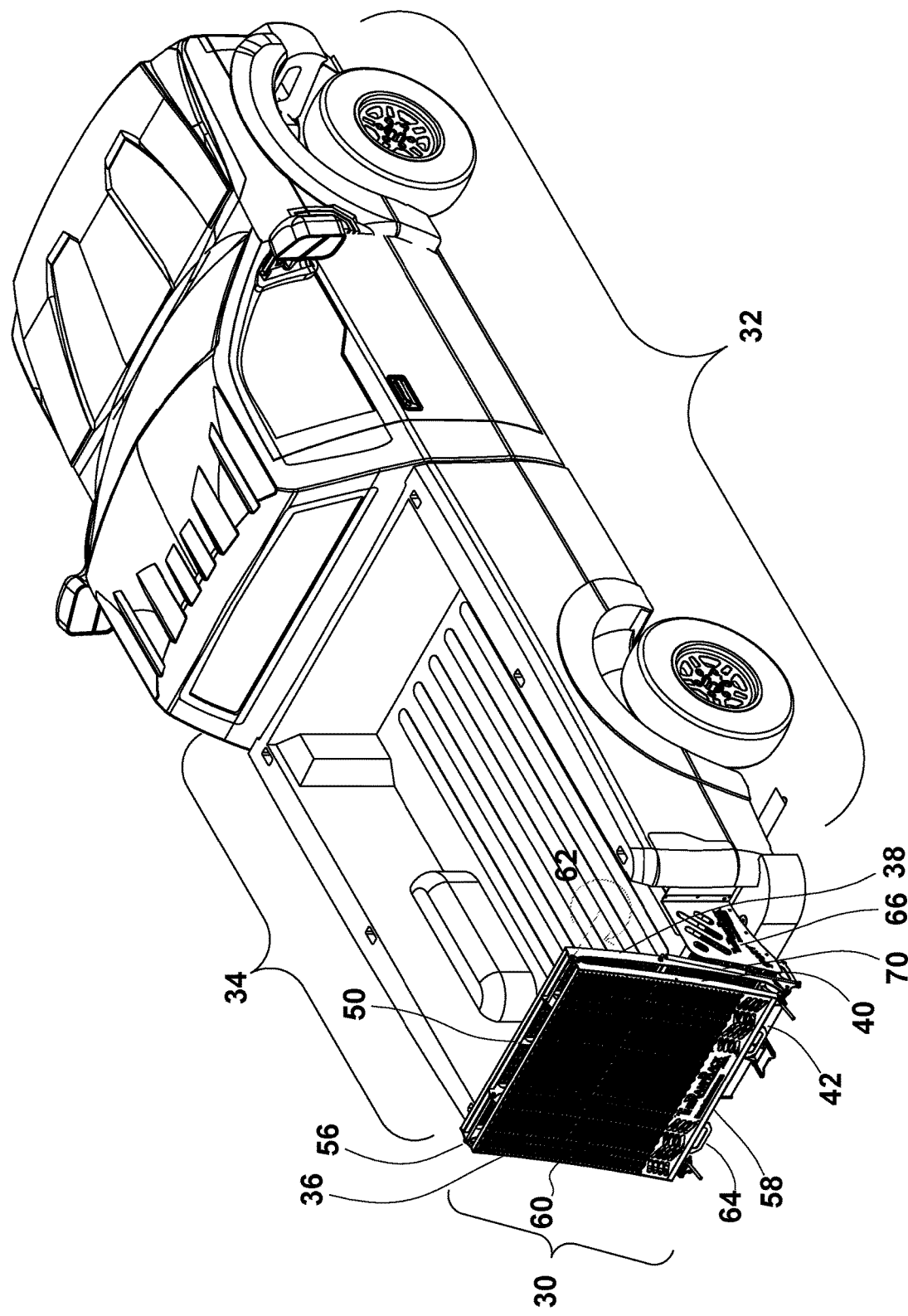
FIG. 1 is a top perspective view of one preferred embodiment of the folding ramp device 30 of the present invention, mounted onto a vehicle 32, such that the cargo bed 34 of the vehicle 32 is accessible via the ramp 36 of the folding ramp device 30. Preferably the folding ramp device 30 can be separably attached to any vehicle 32 which has a cargo bed 34 or any other similar storage space located towards the rear of the vehicle 32. Preferably the folding ramp device 30 comprises a chassis 42, a vehicle bed extender 44, and a ramp 36. More preferably the ramp 36 is comprised of a first ramp section 38 and a second ramp section 40. Preferably the first ramp section 38 is connected to the vehicle bed extender 44 at the first ramp proximal end 48 and the second ramp section 40 at the first ramp distal end 50. The second ramp section 40 may be connected to the first ramp section 38 at the second ramp proximal end 56. Preferably the device 30 is movable from a first closed position, depicted in FIG. 1, to a second open position, depicted in FIG. 6. Preferably the second ramp section 40 has a second ramp distal end 58 on which one or more handles 64 are located to facilitate the manual transition of the device 30 from the first closed position to the second open position. The device 30 may also incorporate a right biasing member 70 and a left biasing member 76 which are connected to the chassis 42 and the first ramp section 38, such that the manual transition of the device 30 from the first closed position to the second open position is slowed down.

Preferably, moving the device 30 from the first closed position to the second open position is accomplished by rotating the first ramp section 38 about the first rotational axis 54 and the second ramp section 40 about the second rotational axis 62. Preferably the first ramp section 38 has a first ramp major surface 52 which is oriented normal to the cargo bed 34 of the vehicle 32 and faces the front of the vehicle 32 when the device 30 is in the first closed position. Preferably the second ramp section 40 has a second ramp major surface 60 which is oriented normal to the cargo bed 34 of the vehicle 32 and faces away from the vehicle 32 when the device 30 is in the first closed position. Preferably the vehicle bed extender 44 is flanked on the right side with a removable right side panel 66 and on the left side with a removable left side panel 68.

Figure 2:
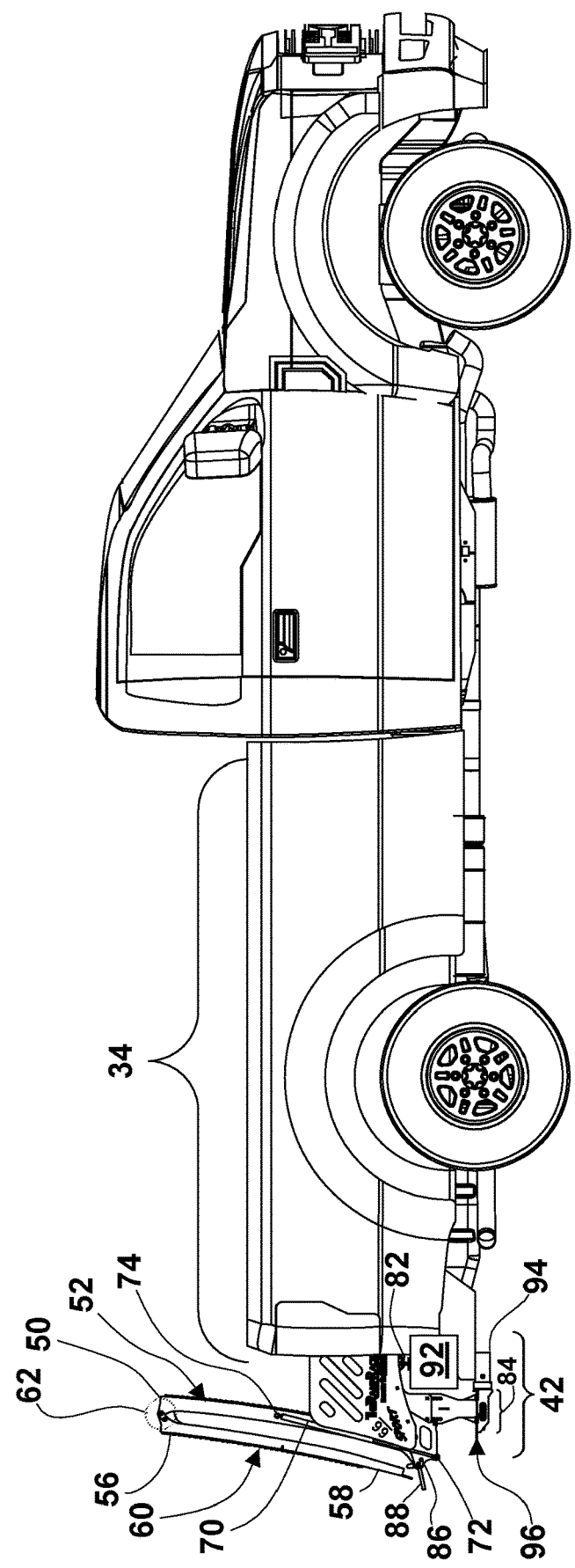

FIG. 2 is a right side view of the device 30 engaged with a vehicle 32. Preferably the device 30 is engaged with a vehicle hitch 94 at a vehicle hitch attachment 84 subcomponent of the chassis 42. More preferably the vehicle hitch attachment 84 is engaged with the vehicle hitch 94 by an adjustable tensioning mechanism 96 whereby the device 30 can be adapted to fit snugly against the cargo bed 34 of a wide range of vehicles 32 which may or may not have differently positioned vehicle hitches 94 and or cargo bed 34 heights. The vehicle bed extender 44 may be buffered from making immediate contact with the vehicle bumper 92 by way of an adjustable right bumper support 82 and an adjustable left bumper support 83. These bumper supports 82, 83 may be configured to allow not only for bumper 92 protection, but also to further the overall adjustability of the device 30 such that it can be used with a wide range of vehicles. Preferably the right biasing member 70 is attached to the first ramp section 38 at the right biasing member distal end 74 and is attached to the chassis 42 at the right biasing member proximal end 72.

Visible in FIG. 2 is a right locking mechanism 82 which may hold the device 30 in the first closed position. Preferably the left side of the device 30 has a left locking mechanism 98 which also holds the device 30 in the first closed position. The right locking mechanism 86 preferably has a first locked position and a second unlocked position. The left locking mechanism 98 preferably has a first locked position and a second unlocked position. Preferably the right locking mechanism 86 can be moved from the first locked position to the second unlocked position through the application of downward force on a right locking bar 88. Preferably the left locking mechanism 98 can be moved from the first locked position to the second unlocked position through the application of downward force on a left locking bar 100.

Figure 3:
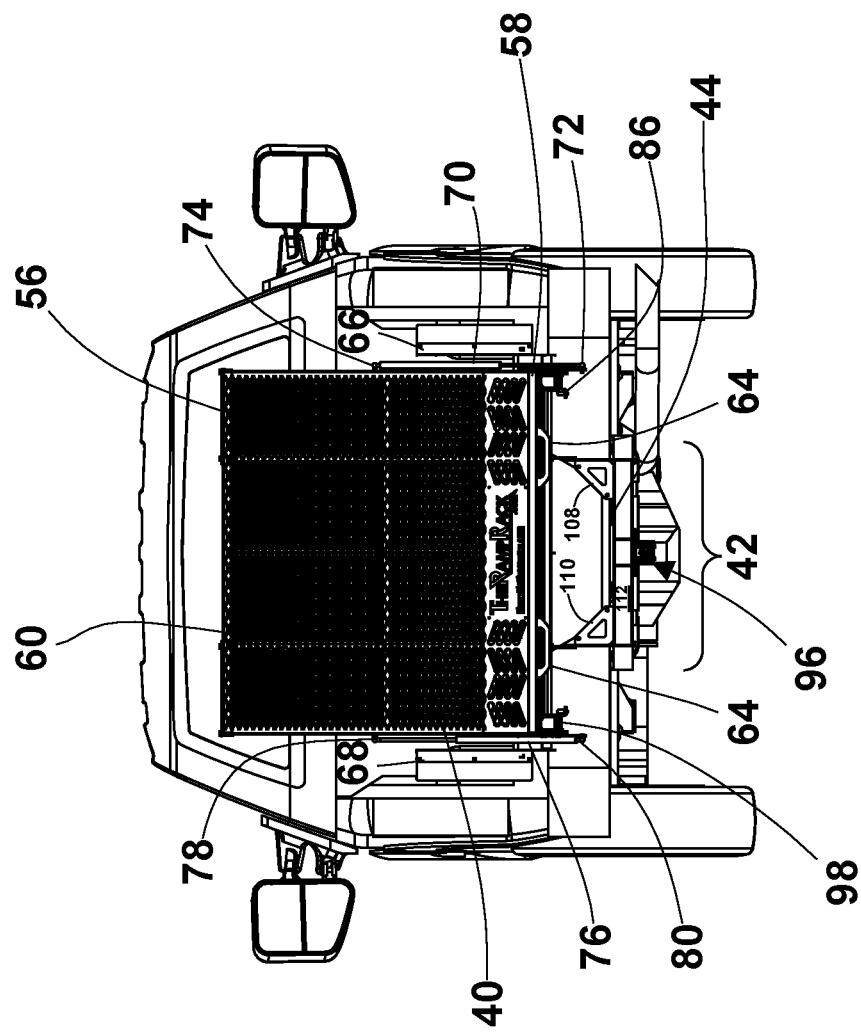

FIG. 3 is a rear view of the device in the first closed position. Preferably the chassis 42 extends upward from the vehicle hitch attachment 84 with a chassis spreader 112 onto which the vehicle bed extender 44 rests. The chassis spreader 112 may be supported on the right side with a right chassis brace 108, and on the left side with a left chassis brace 110 which may facilitate the transfer of downward force applied to the vehicle bed extender 44 while the device 30 is in use.

Figure 4:
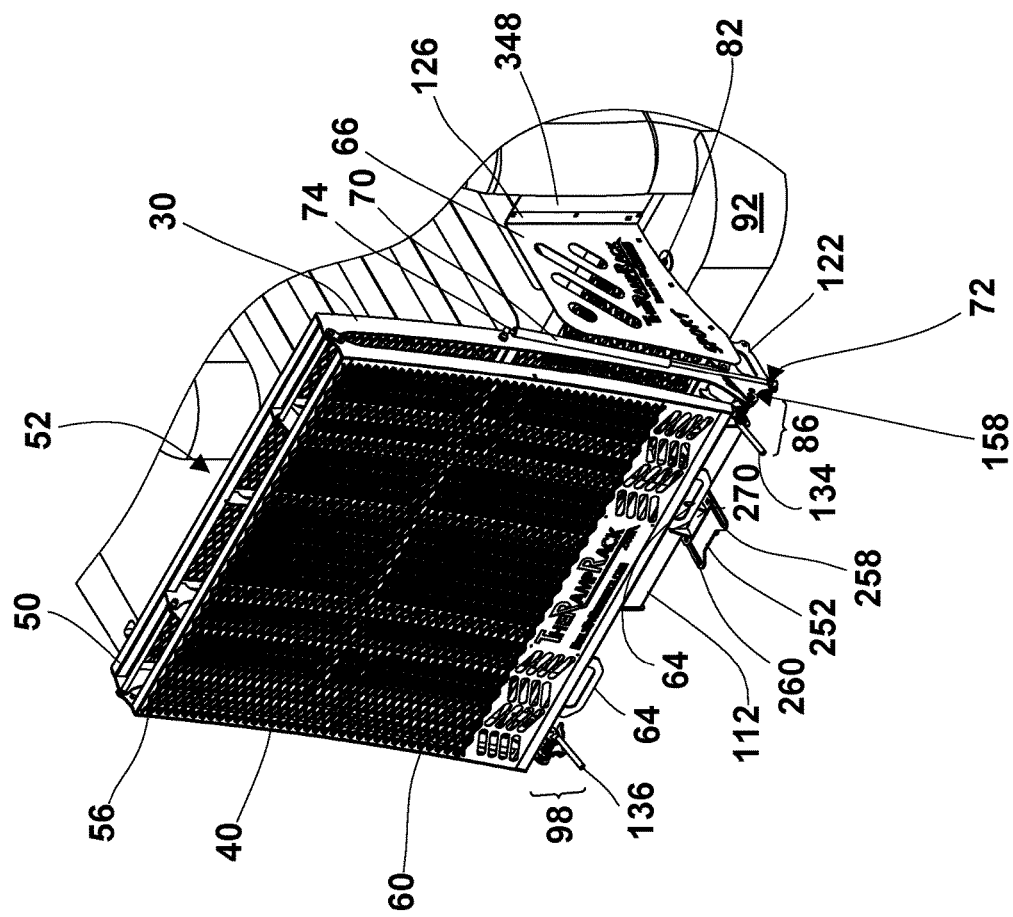

FIG. 4 is a partial perspective view of one preferred embodiment of the present invention in the first closed position. From this view it can be seen that the vehicle bed extender 44 may further comprise two flanking flanges herein referred to as the right support flange 122 and the left support flange 124. The right biasing member 70 may be connected to the first ramp section 38 at the right biasing member distal end 74 and to the right support flange 122 at the right biasing member proximal end 72. Further, the right-side panel 66 may be affixed to the right-side panel vehicle bed plate 348 at the right panel mounting flange 126 which extends from the body of the right-side panel 66. The right locking mechanism 86 in the left locking mechanism 98 may interface with the right support flange 122 and the left support flange 124 respectively. The right locking mechanism 86 may interface with the right support flange 122 at the right support flange lock receiver 158 which is defined by an absence of material on the right support flange 122. Similarly, the left locking mechanism 98 may interface with the left support flange 124 at the left support flange lock receiver 160. The vehicle hitch attachment 84 may further comprise a vehicle hitch adjustment plate 252 into which the chassis 42 may be mounted via adjustable grooves in the vehicle hitch adjustment plate 252 herein referred to as the back right hitch adjustment groove 254, the back left hitch adjustment groove 256, the front right hitch adjustment groove 258, and the front left hitch adjustment groove 260.

Figure 5:
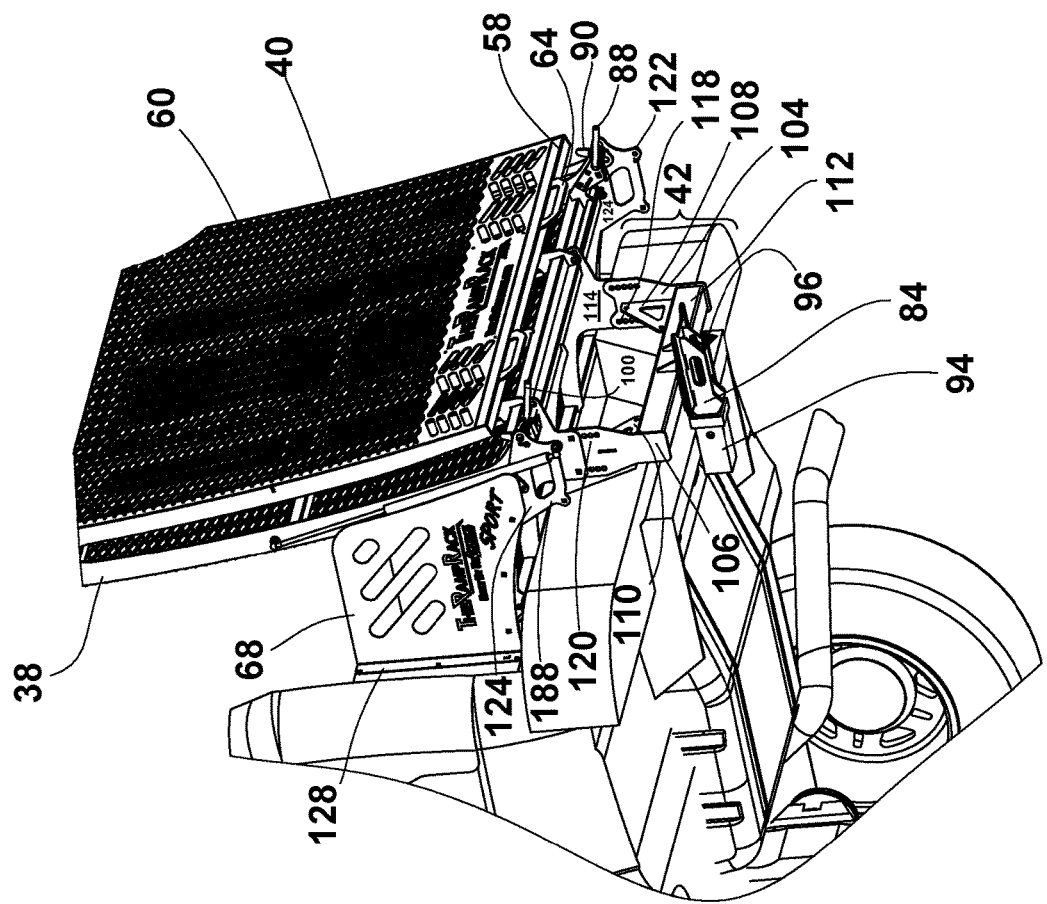

FIG. 5 is a bottom partial perspective view of one preferred embodiment of the present invention the first closed position. The chassis 42 may be further comprised of a chassis spreader 112 which may have a right height adjustment plate 104 and a left height adjustment plate 106 mounted to the respective ends and extending upwards towards the vehicle bed 34, which may respectively be braced by the right chassis brace 108 and the left chassis brace 110. The height adjustment plates may have a series of holes on them herein referred to as the right height adjustment holes 118 and the left height adjustment holes 120 which are configured to allow the vehicle extender 44 to be adjusted laterally such that the device 30 is compatible with a large variety of vehicle bed 34 heights. This adjustability may be accomplished by securing the right central riser 114 and the left central riser 116 of the vehicle bed extender 44 into the right height adjustment plate 104 and the left height adjustment plate 106 into different right height adjustment holes 118 and left height adjustment holes 120. Further the left locking mechanism 98 may be manipulated from a first locked position to a second unlocked position through the application of downward force on the left locking bar 100.

Figure 6:
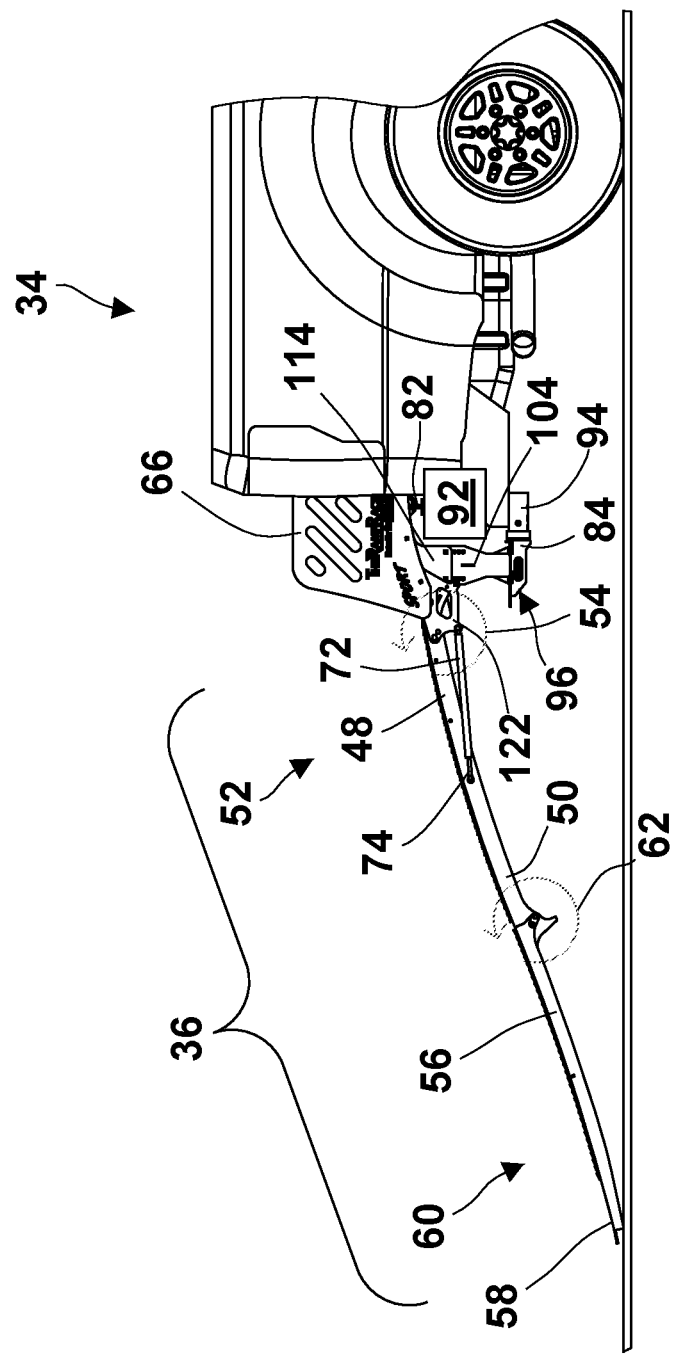

FIG. 6 is a right side view of the device 30 engaged with a vehicle 32 in the second open position. Herein it can be observed that when the device 30 is in the second open position the second ramp distal end 58 rests on the grounds and the first ramp major surface 52 and the second ramp major surface 60 may join with the vehicle bed extender to form a continuous path from the ground to the vehicle cargo bed 34 such that objects may be easily transferred to and/or from the vehicle bed 34. Further it can be observed that the device 30 may be configured to be manipulated from the first closed position to the second open position by rotating the first ramp section 38 about the first rotational axis 54 and the second ramp section 56 about the second rotational axis 62.

Figure 7:
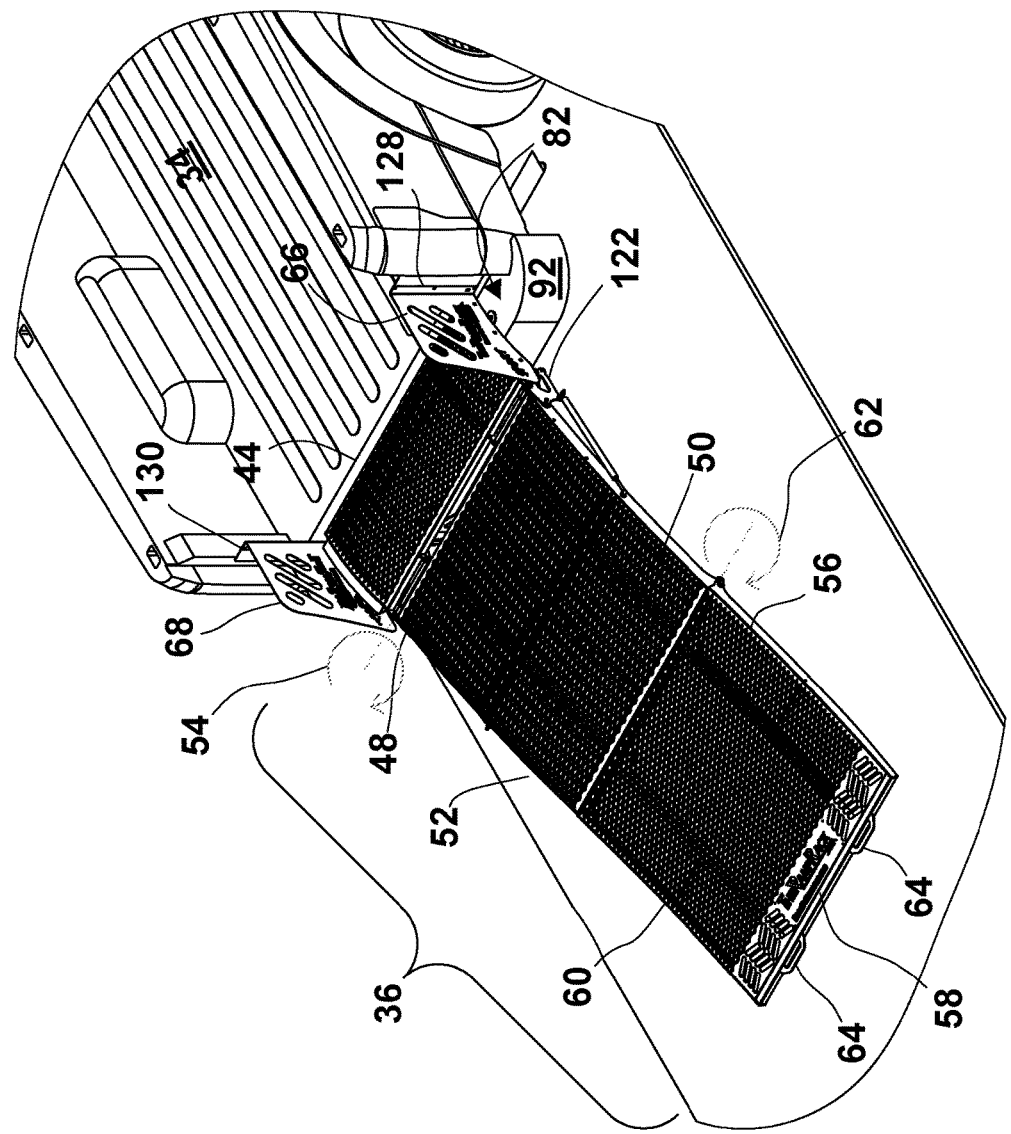

FIG. 7 is a top partial perspective view of the device 30 engaged with a vehicle 32 in the second open position. When the second ramp distal end 58 rests on the grounds, the handles 64 also rest on the ground.

Figure 8:
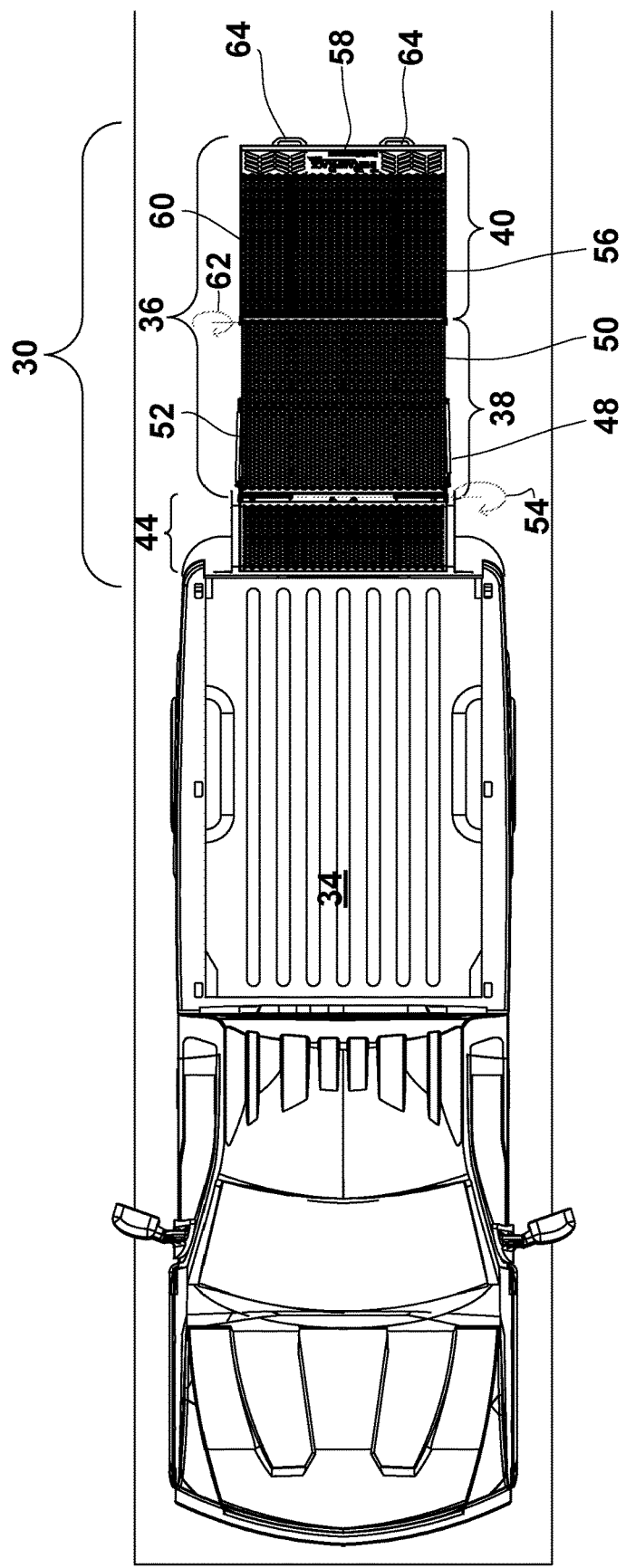

FIG. 8 is a top view of the device 30 in the second open position, engaged with a vehicle 32.

Figure 9:
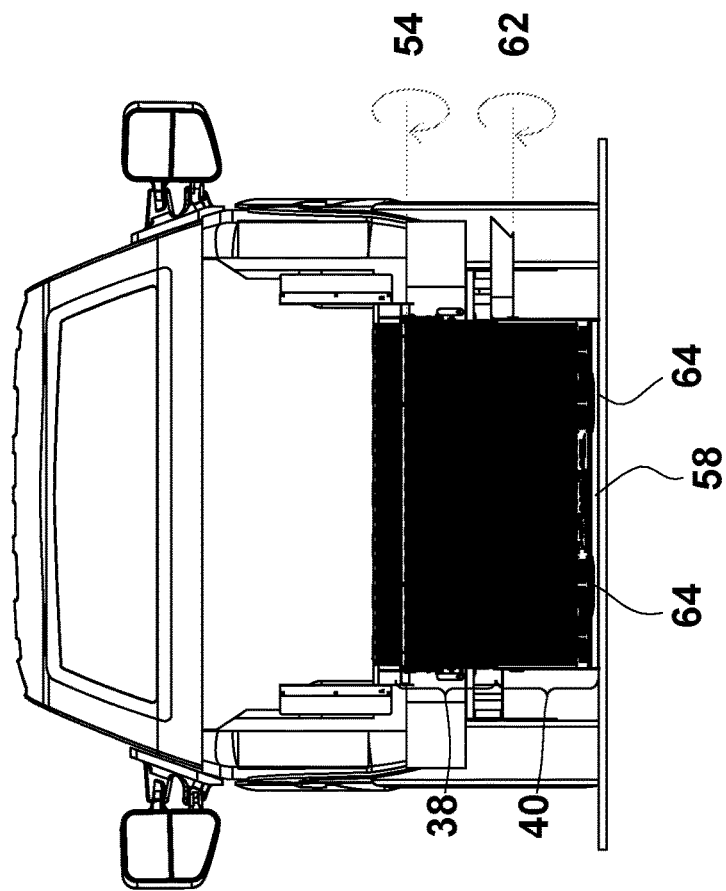

FIG. 9 is a rear view of the device 30 in the second open position, engaged with a vehicle 32.

Figure 10:
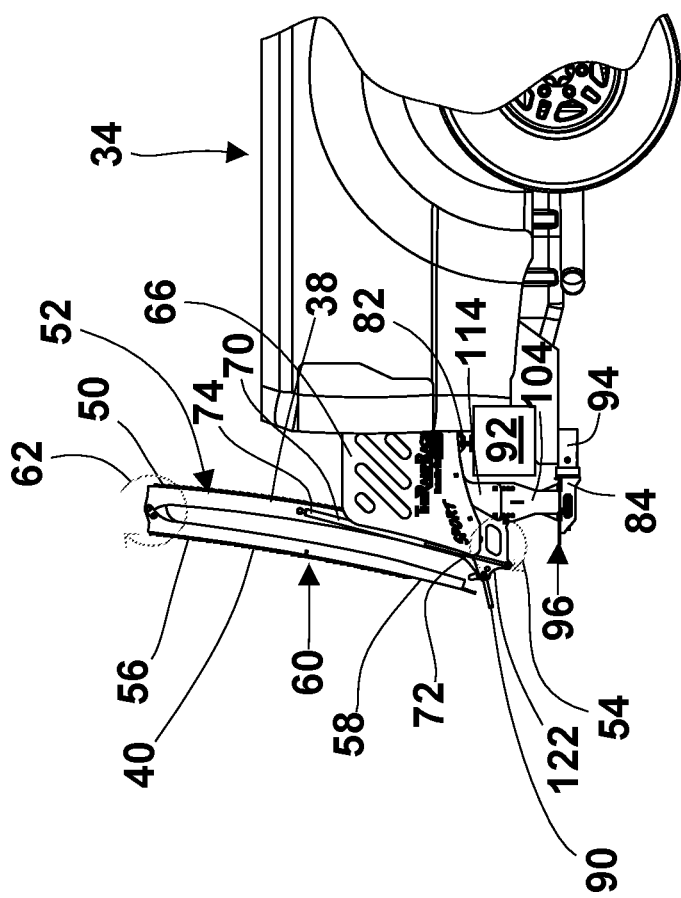

FIG. 10 is a right side view of the device 30 in the first closed position, engaged with a vehicle 32.

Figure 11:
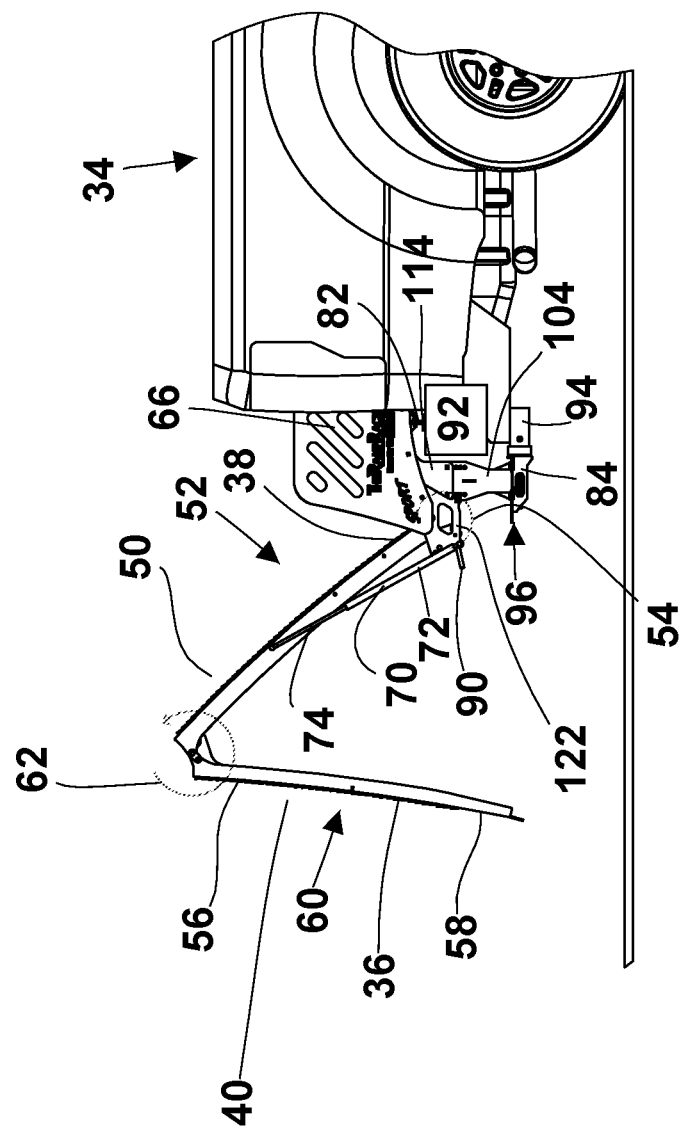

FIG. 11 is a right side view of the device of the device 30 in between the first closed position and the second open position, illustrating that the device is configured to be transitioned between the two positions by rotating the first ramp section about the first axis of rotation 54 and the second ramp section 38 about the second axis of rotation 62.

Figure 12:
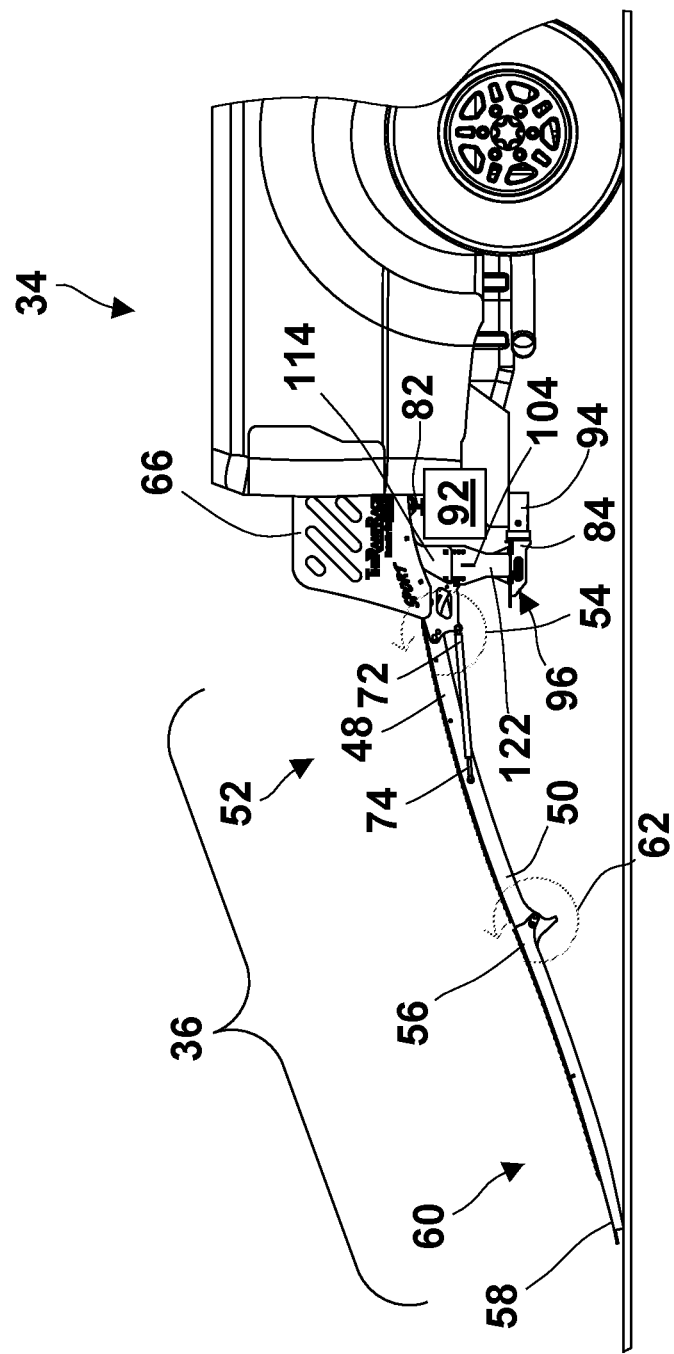

FIG. 12 is a right side view of the device 30 in the second open position.

Figure 13:
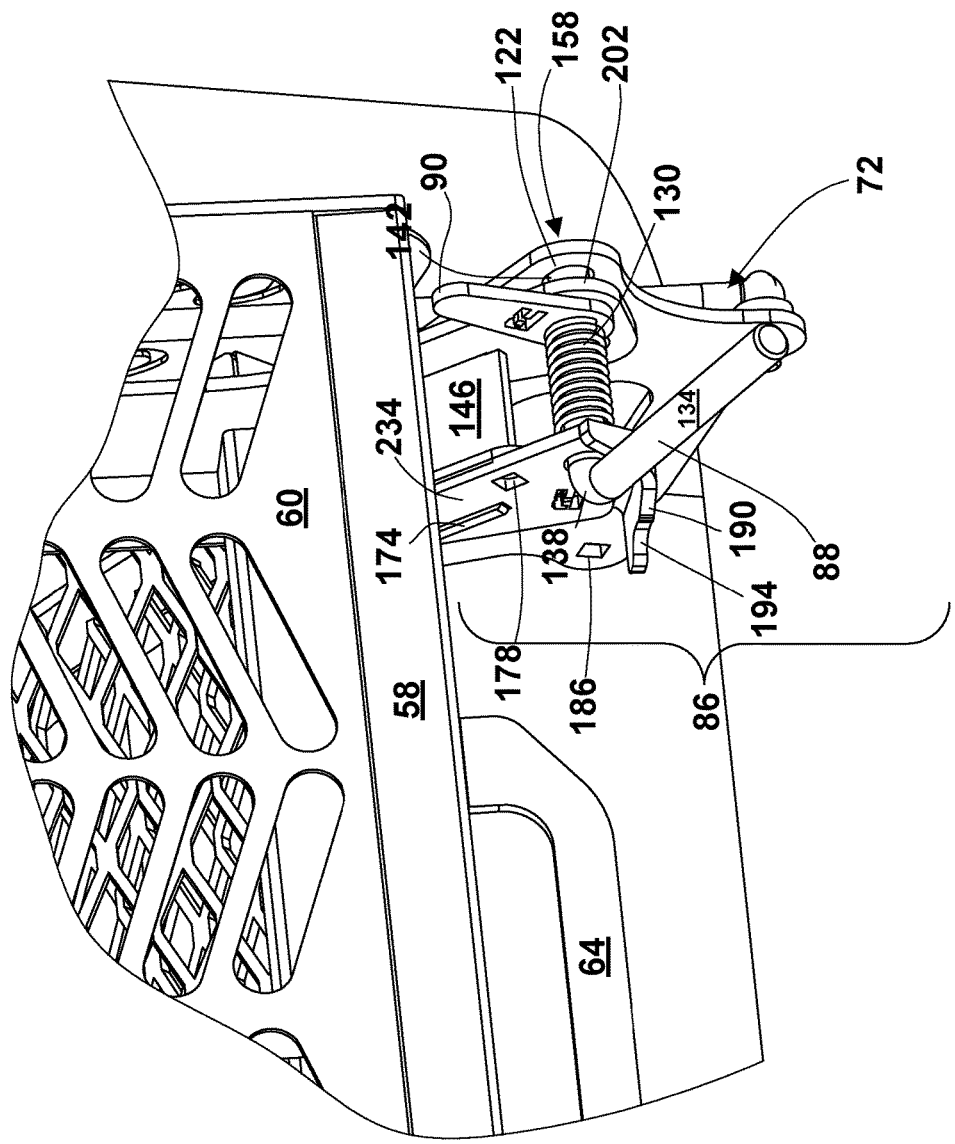

FIG. 13 is an enlarged partial perspective view of the locking mechanism 86 when the mechanism 86 is in the first locked position. Herein it can be seen that the right locking bar 88 may further comprise a right locking bar handle 134, a right locking bar elbow 138, a right reset spring 130, a right reset flipper 90, and terminates in a right locking bar engaging portion 142. Preferably the right locking bar may be housed between the right interior locking ramp flange 198, and the right exterior locking ramp flange 202. More specifically the portion of the right interior locking ramp flange 198, which houses the right locking bar 88, may be a right locking plate 234 which is directly affixed to the surface of the right interior locking ramp flange 198. Preferably the right interior locking ramp flange 198 and the right exterior locking ramp flange 202 are separated by a right locking mechanism spacer 146 which is secured in the right interior locking ramp flange 198 at an interior right spacer slot 174. The right locking plate 234 may further comprise a lower interior right lock bolt hole 178 defined by an absence of material in the plate 234. The right support flange 122 may further comprise a right reset pin hole 186 similarly defined by an absence of material in the flange 122.

Figure 14:
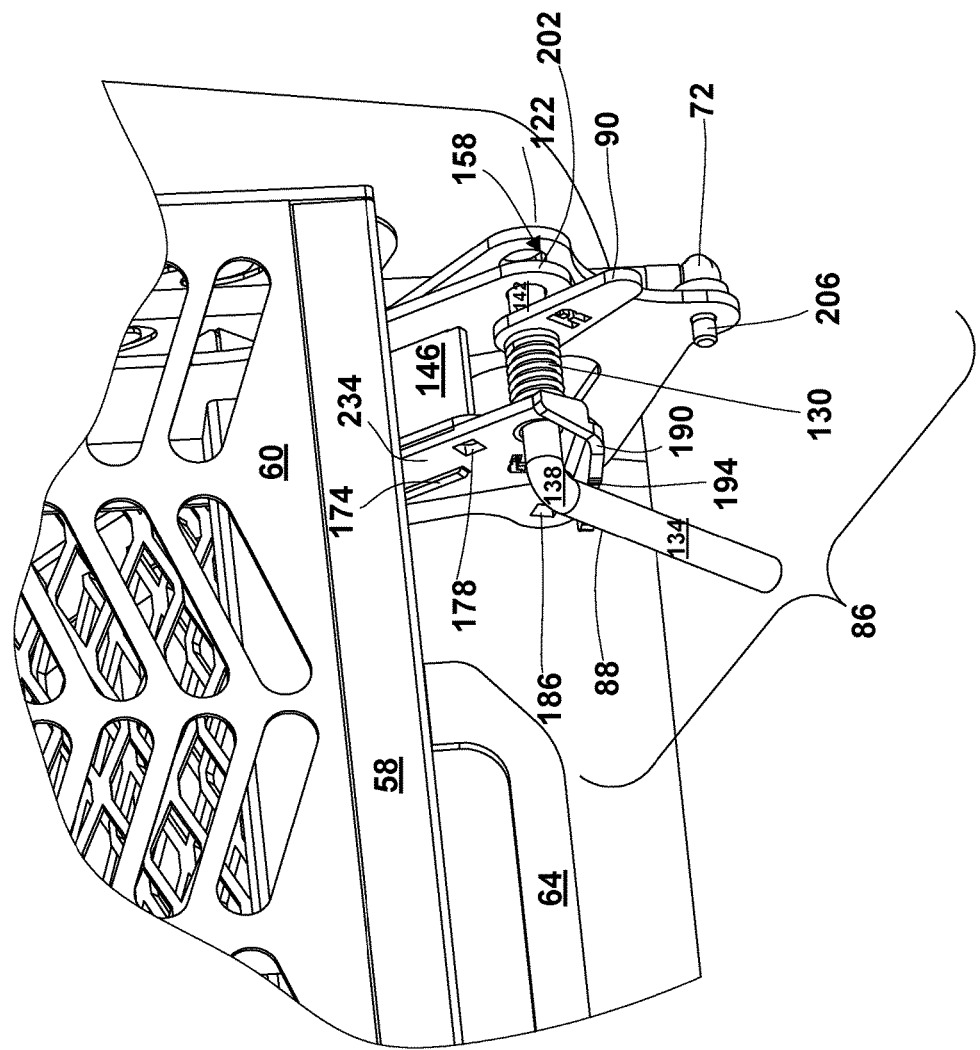

FIG. 14 is an enlarged partial perspective view of the right locking mechanism 86 when the mechanism 86 is in the second unlocked position. Preferably the right locking bar handle 134 is separated from the right locking plate 234 by a right locking handle spacer 190. Preferably the right locking handle spacer 190 is configured to have a lower width in the portion in contact with the right locking bar handle 134 when the mechanism 86 is in the first locked position, and a greater width in the portion in contact with the right locking bar handle 134 when the mechanism 86 in the second unlocked position. Preferably the portion of the right locking handle spacer 190 which accommodates the right locking handlebar 134 when the device 86 is in the second unlocked position, is a small groove, herein referred to as the right locking handle spacer receiver 194.

Figure 15:
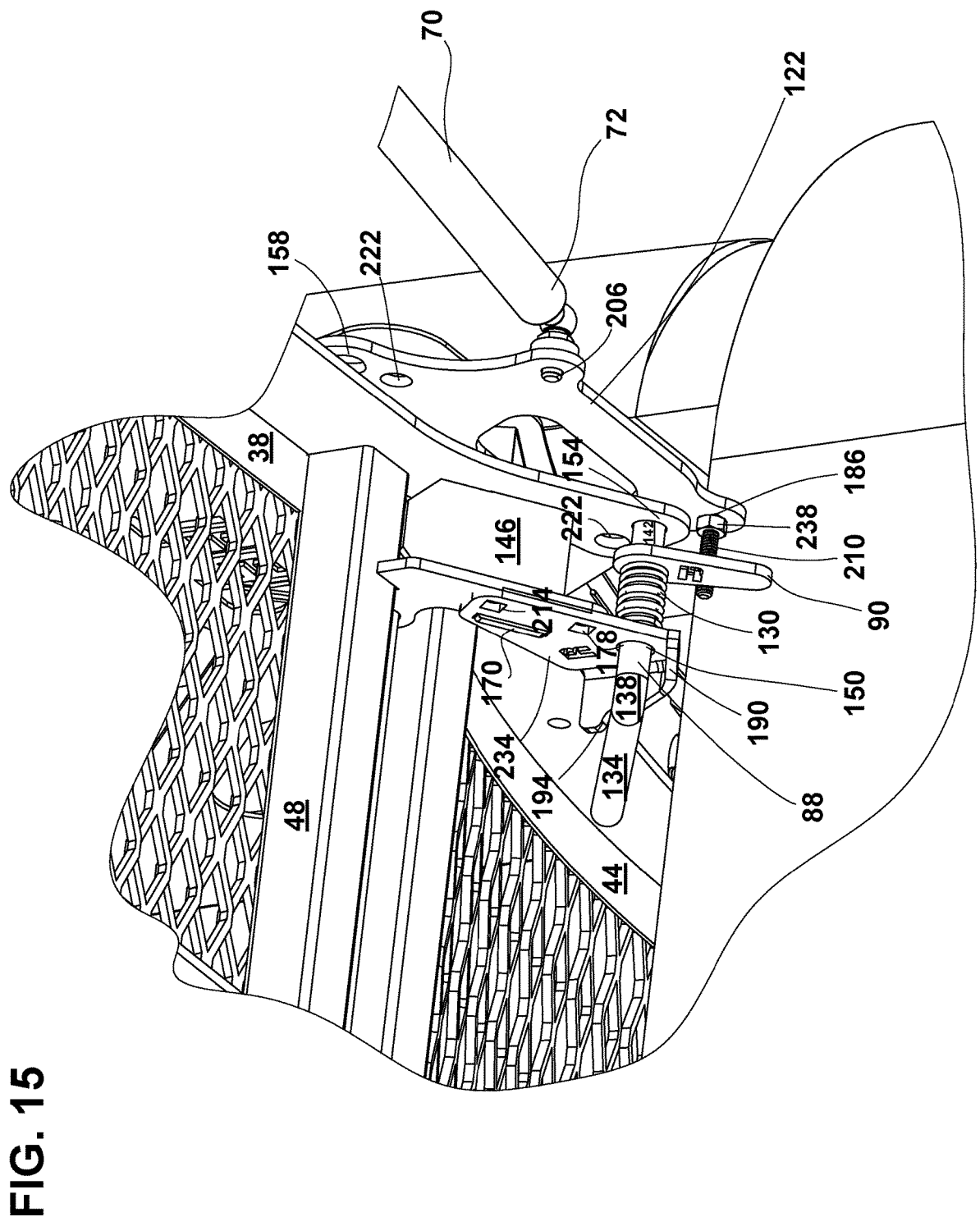

FIG. 15 is an enlarged partial perspective view of the right locking mechanism 86 when the mechanism 86 is in the second unlocked position. Preferably the right locking plate 234 further comprises an upper interior right lock bolt hole 214 which is defined by an absence of material in both the right locking plate 234 and the right interior locking flange 198. The right exterior locking ramp flange 202 may have two holes in it defined by an absence of material in the flange 202, the upper of which is herein referred to as the right locking adjustment hole 222, and the lower of which is herein referred to as the right exterior locking bar guide 154 which is configured to hold a portion of the right locking bar 88 while it is in both the first locked position and the second unlocked position. The right locking plate 234 may further comprise an interior right locking bar guide 150 which similarly supports a portion of the right locking bar 88 while it is in both the first locked position and the second unlocked position and may be defined by an absence of material in the plate 234. Mounted in the right reset pin hole 186 may be a right reset pin 210 secured in position by a right reset pin bolt 238. The right reset pin 238 is preferably configured to make contact with the right reset flipper when the device 30 is moved from the first closed position to the second open position, and in the process of doing so will facilitate the automatic conversion of the right locking mechanism 86 from the second unlocked position to the first locked position by putting the right locking bar 88 in a location such that the right reset spring 130 can return the right locking bar engaging portion 142 into the right support flange receiver 158 upon the return of the device 30 to the first closed position.

Figure 16:
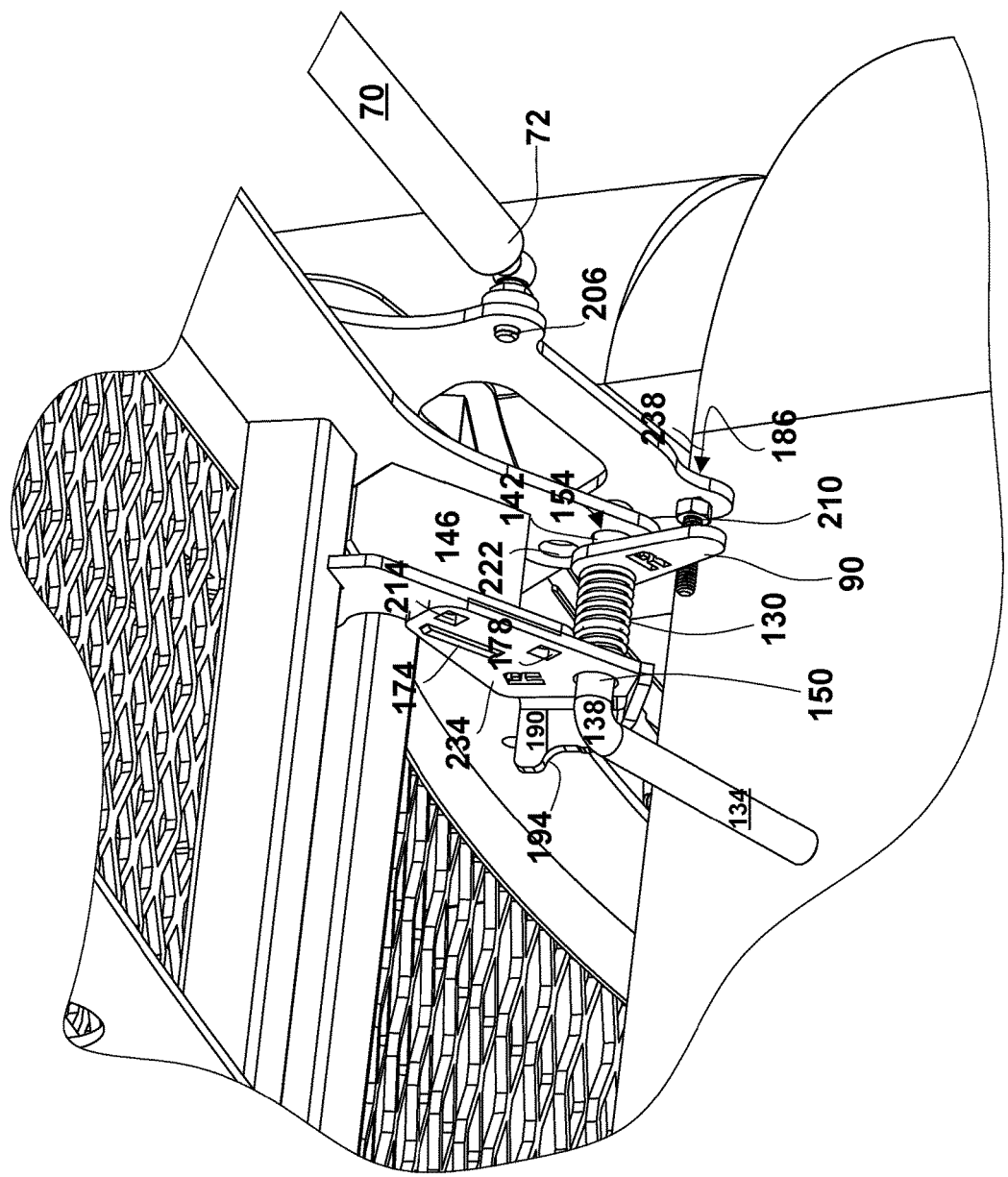

FIG. 16 is an enlarged partial perspective view of the right locking mechanism 86 when the mechanism 86 is in the first locked position.

Figure 17:
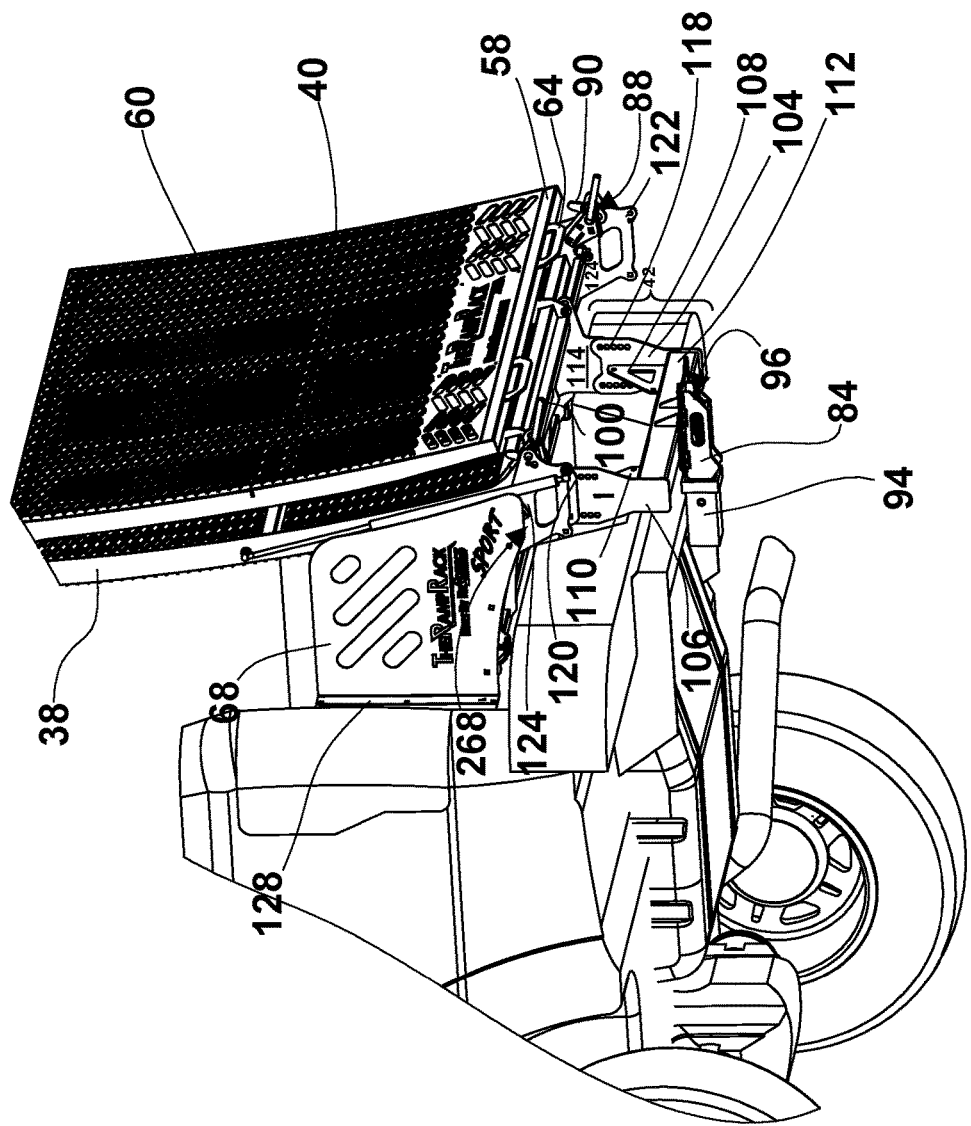

FIG. 17 is side perspective view of the device 30 when the device 30 is in the first closed position.

Figure 18:
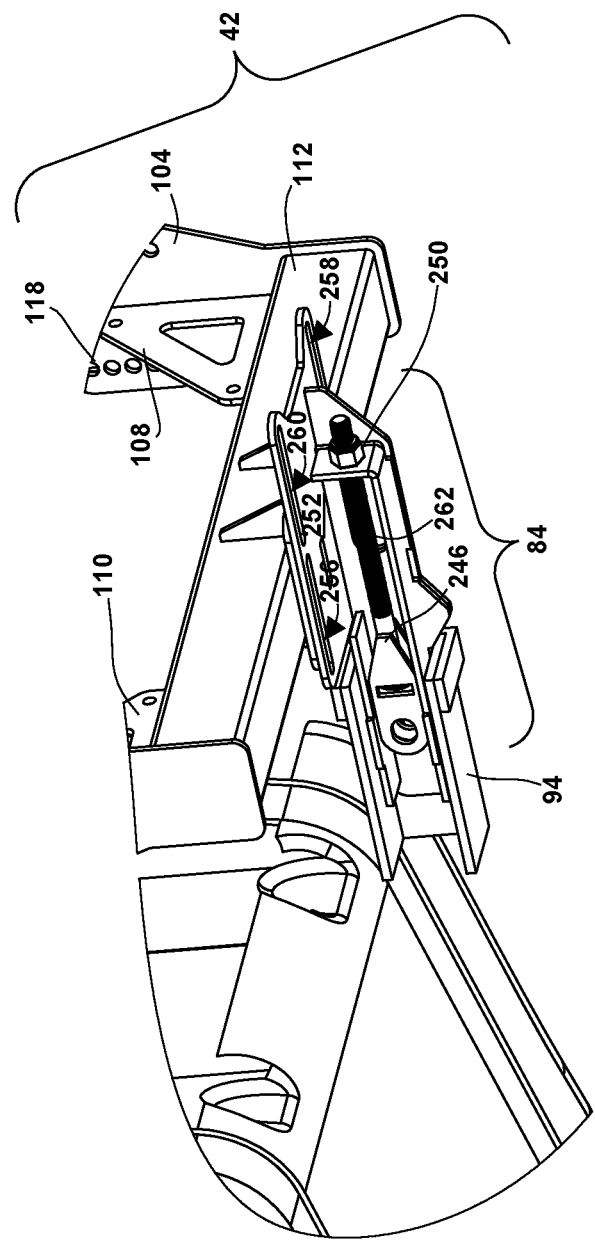

FIG. 18 is a cutaway view of the vehicle hitch attachment 84 mounted into a vehicle hitch 94. Preferably the vehicle hitch attachment 84 is further comprised of a vehicle hitch adjustment plate 252 into which the rest of the chassis 42 may be affixed, a tension rod 246, and a tension nut 250. Preferably, the body of the vehicle hitch attachment 84 is configured to be engaged with the opening of a standard vehicle hitch 94. Preferably the body of the vehicle attachment has a vehicle hitch pin slot 264 on either side which is configured to accept a standard hitch pin, are defined by an absence of material on the vehicle hitch attachment body 84. Further, the tension rod 246 also has holes on its sides defined by an absence of material configured to accept a standard hitch pin, herein referred to as vehicle hitch tension bolt holes 248. The tension rod 246 may have a threaded portion 262 on its distal and which is configured to accept a tensioning nut 250. Preferably, the tensioning nut rests on the exterior of the vehicle hitch attachment body 84 when engaged with the threaded portion 262 of the tension rod 246.

Figure 19:
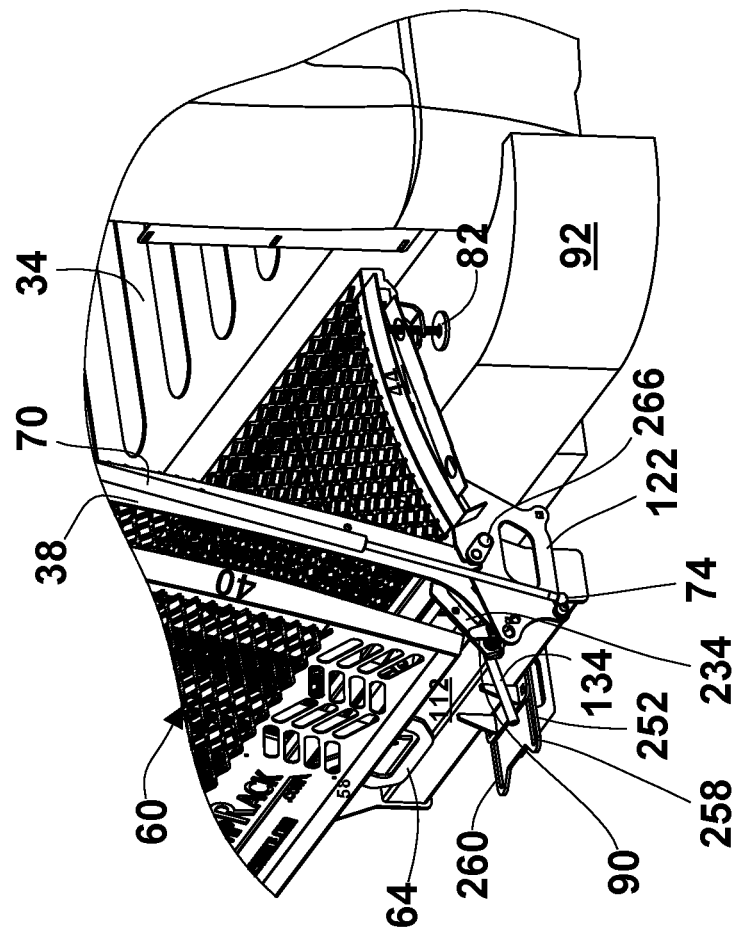

FIG. 19 is an enlarged partial perspective view of the right support flange 122 when the right-side panel 66 is not affixed.

Figure 20:
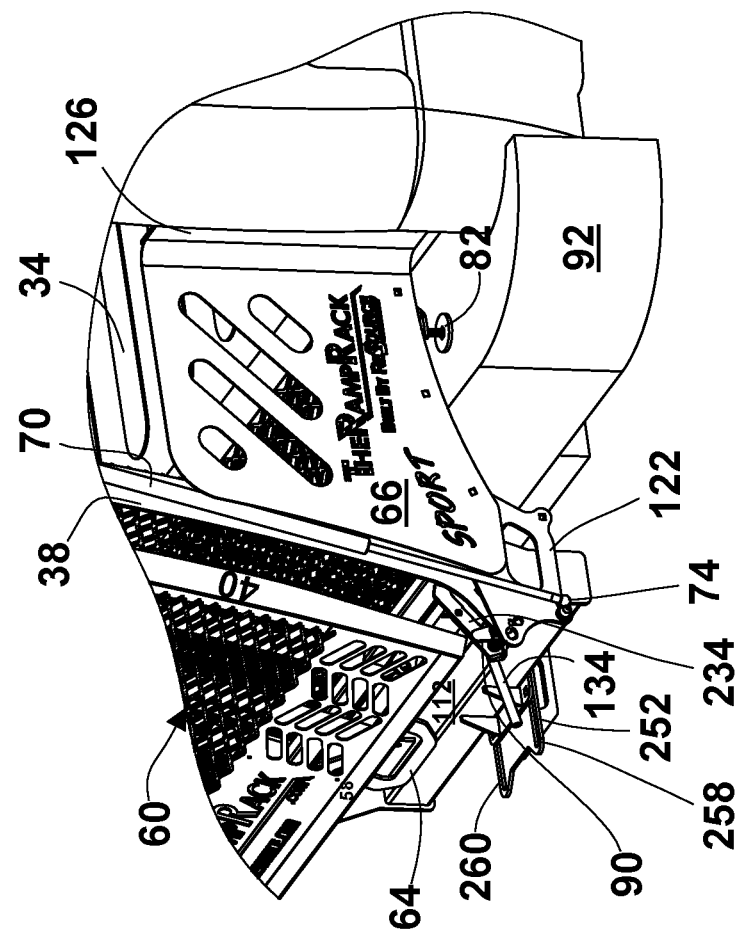

FIG. 20 is an enlarged partial perspective view of the right support flange 122 when the right-side panel 66 is affixed.

Figure 21:
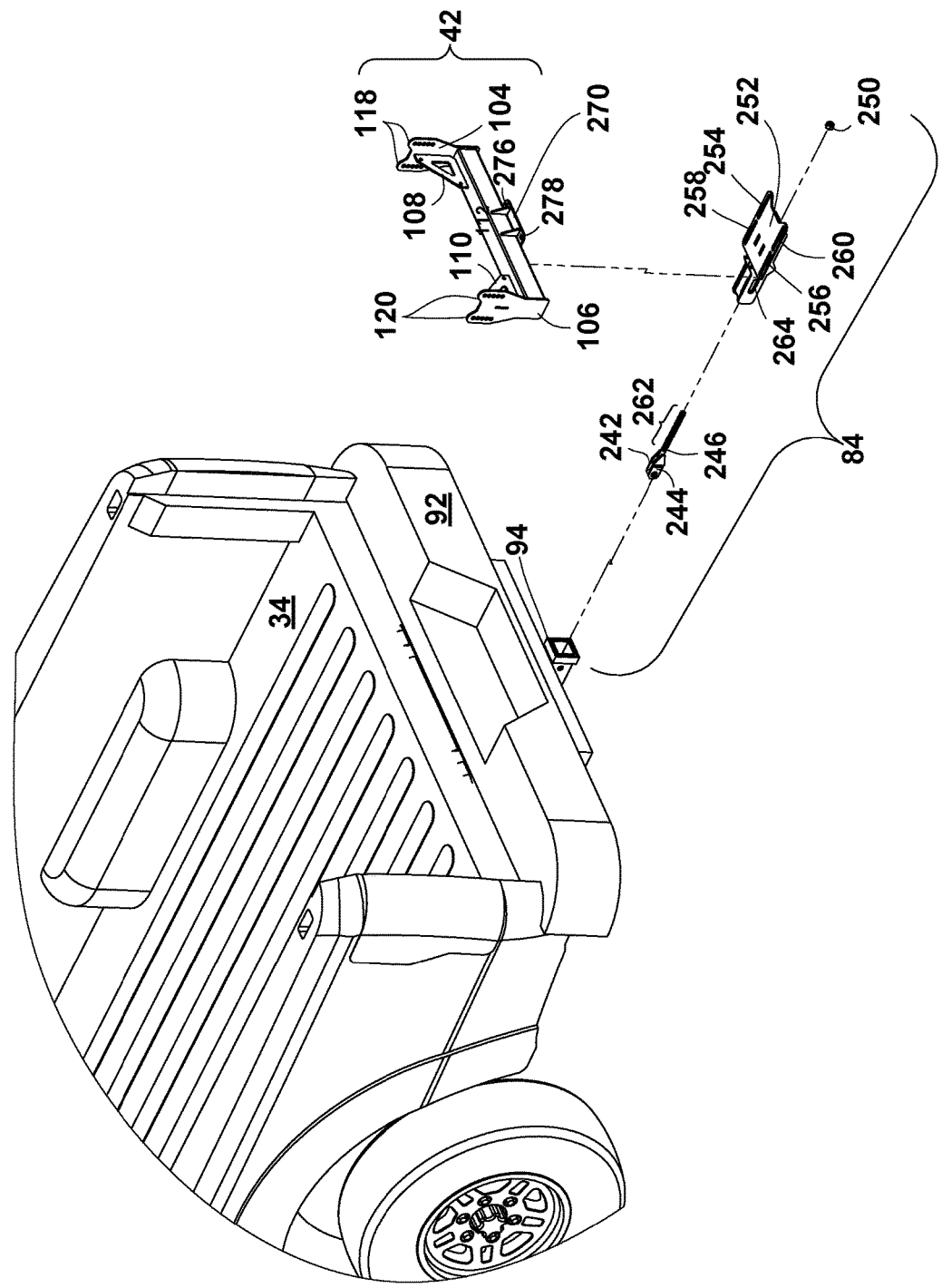

FIG. 21 is an exploded view of the vehicle hitch attachment 84 and chassis 42 such that the individual components of each, the way they may interlock, can be more easily observed.

Figure 22:
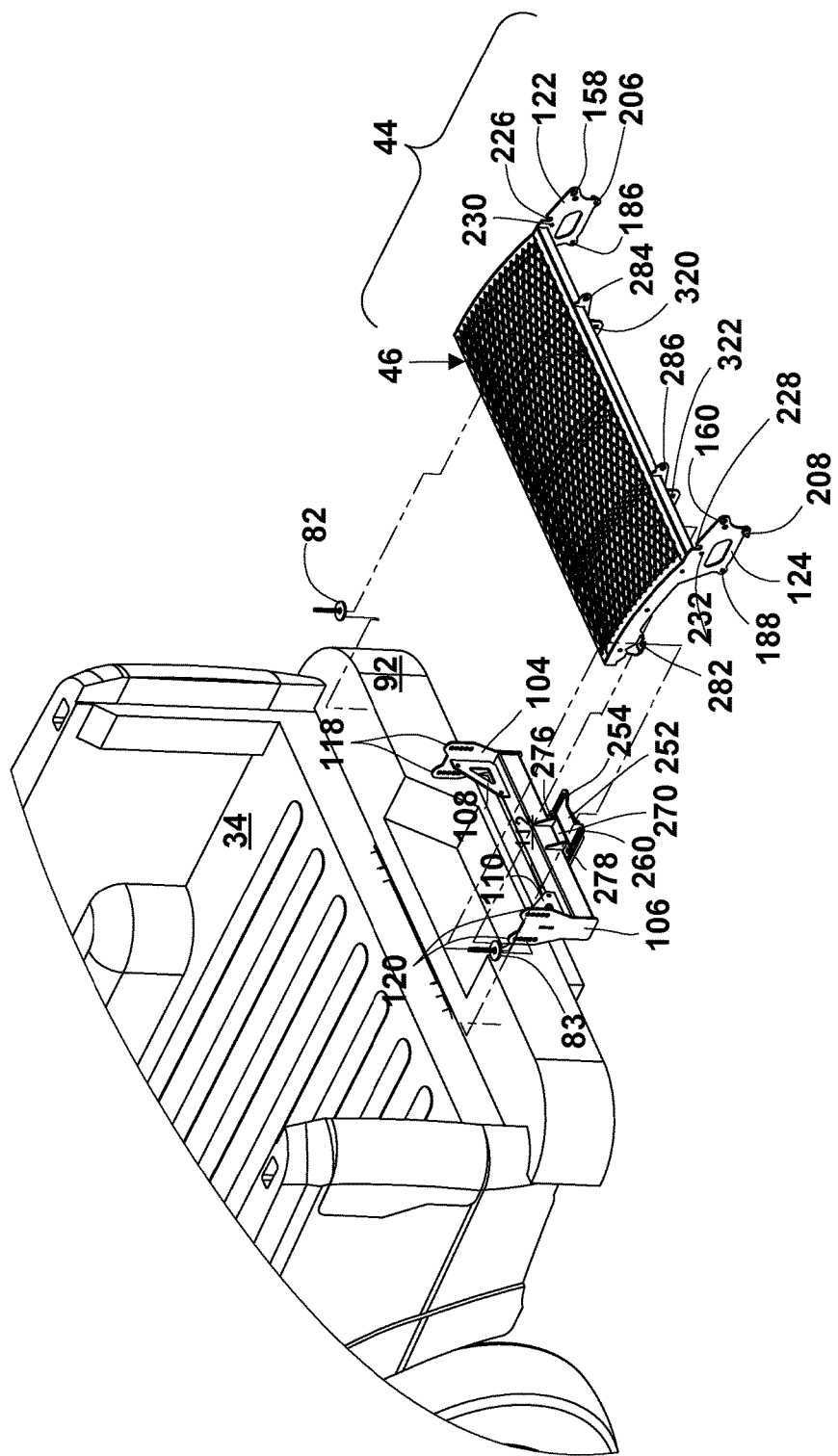

FIG. 22 is an exploded view of the vehicle bed extender 44 separated from the chassis 42 and vehicle hitch attachment 84 components of the device 30, when the latter two of which are engaged with the vehicle 32.

Figure 23:
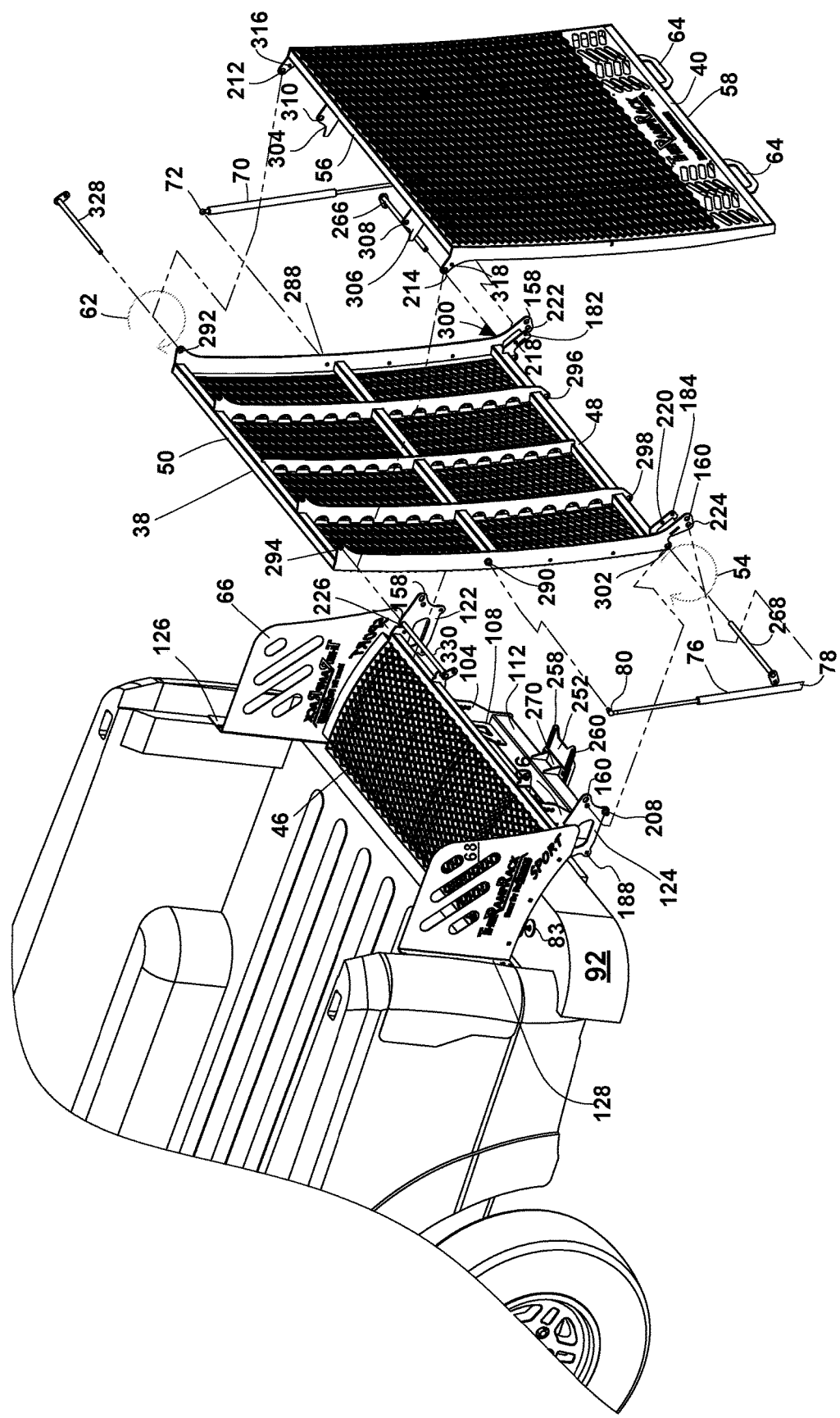

FIG. 23 is exploded view the device 30. Preferably the first ramp section 38 is engaged with the vehicle bed extender 44 by a first rotational axis right rod 266 and a first rotational axis left rod 268 which pass through the first rotational axis right external ramp guide 300 and the first rotational axis left external ramp guide 302, defined by an absence of material on the body of the first ramp section 38. These rods 300, 302 may be engaged with the vehicle bed extender 44 at a right flange first rotational axis pivot guide 226 and a left flange first rotational axis pivot guide 228, which may be defined by absences of material in the right support flange 122 and left support flange 124 respectively. Preferably the second ramp section 40 is engaged with the first ramp section 38 by a second rotational axis right rod 328 and a second rotational axis left rod 330 which are configured to be secured in the second ramp section 38 by a second ramp first guide hole 308, a second ramp second guide hole 310, a second ramp third guide hole 312, and a second ramp forth guide hole 314. The third guide hole 312 and the fourth guide hole 314 may be defined by absences of material the right and left exterior portions of the second ramp section 40. Preferably, protruding from the inside of the second ramp portion proximal end 56 are two small flanges herein referred to as the right second ramp flange 304 and the left second ramp flange 306. The first guide hole 308 may be defined by an absence of material in the right second ramp flange 304, while the second guide hole 310 may be defined by an absence of material in the left second ramp flange. Preferably the second rotational axis rods 328, 330 are similarly secured in the first ramp section 38 at the second rotational axis first ramp right guide hole 292 and the second rotational axis first ramp left guide hole 294, defined by absences of material in the first ramp section distal end 50. Preferably the second rotational axis rods 328, 330 are locked into place with carriage bolts that pass through a second rotational axis right carriage bolt hole 316 and a second rotational axis left carriage bolt hole 318 which are defined by absences of material in the proximal end of the second ramp section 40.

Figure 24:
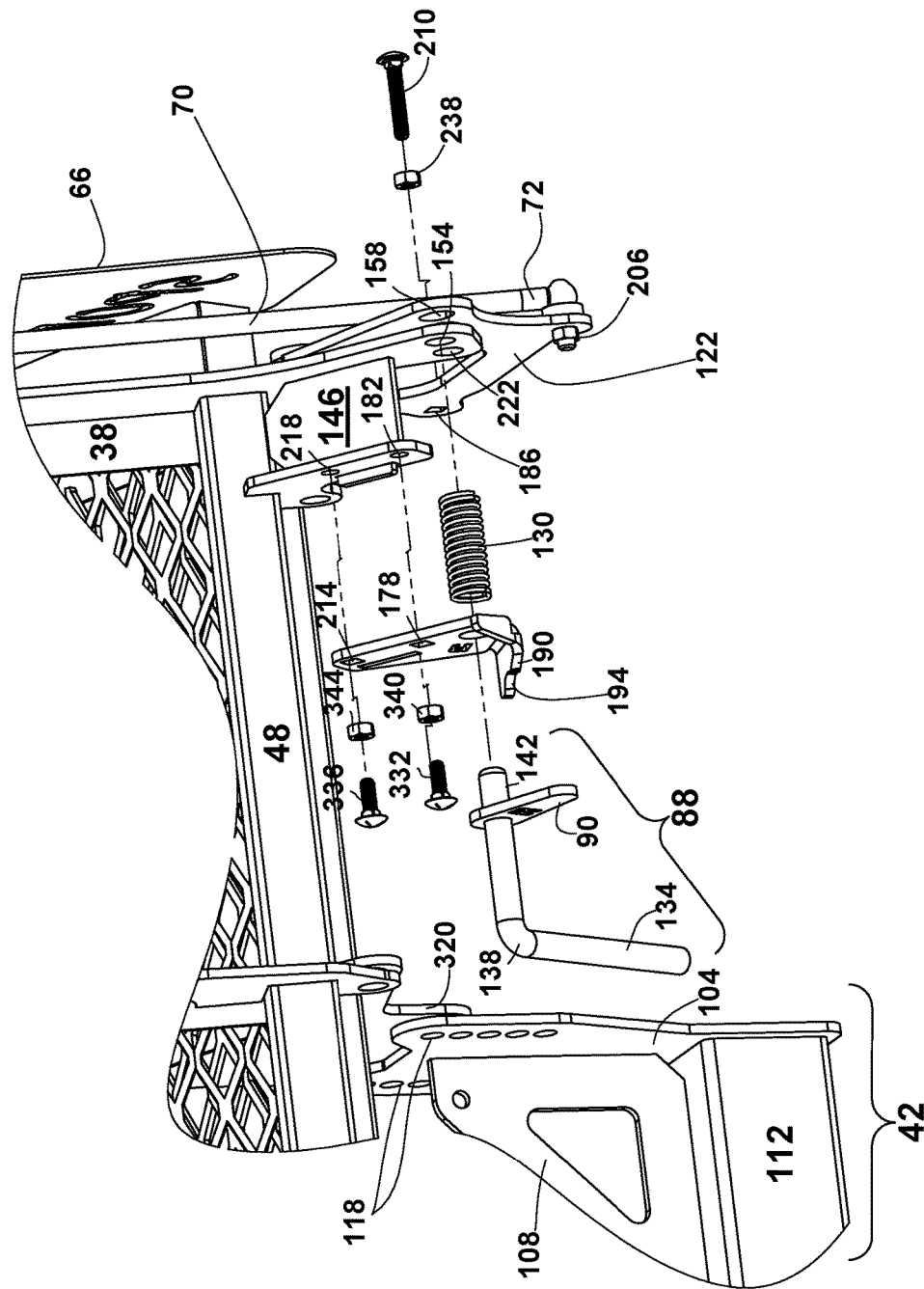

FIG. 24 is an exploded view of the right locking mechanism 86. Preferably the right locking plate 234 is held in position against the interior locking right ramp flange 198 by the upper right lock bolt 336 and the lower right lock bolt 332 which may be secured with the upper right lock nut 344 and the lower right lock nut 340 respectively. The upper bolt 336 may pass through the right locking plate 234 at the upper interior right lock bolt hole 214, and the interior locking right ramp flange 198 at the upper exterior right lock bolt hole 218. The lower bolt 332 preferably passes through the right locking plate 234 at the lower interior right lock bolt hole 178, and the interior locking right ramp flange 198 at a lower exterior right lock bolt hole 182.

Figure 25:
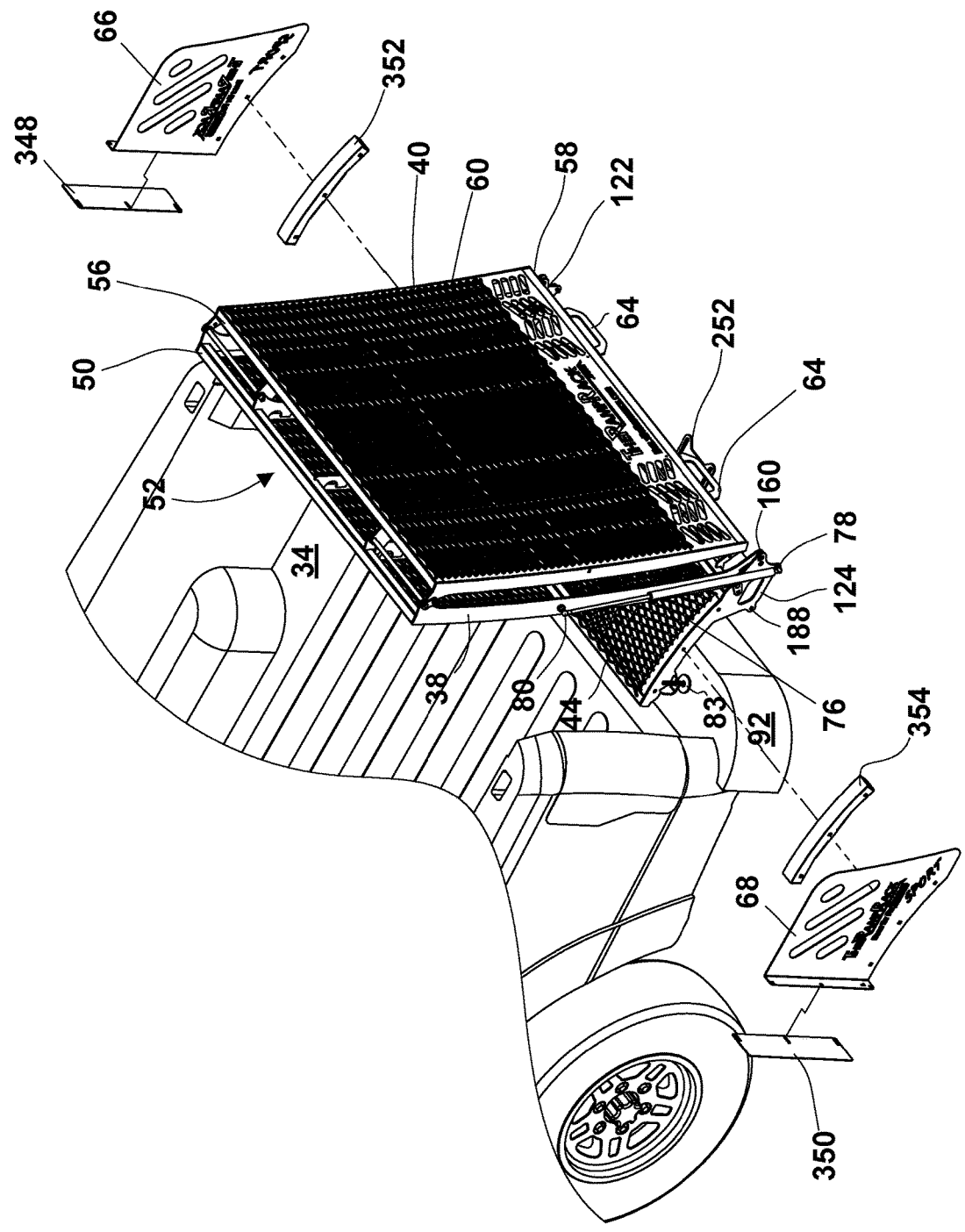

FIG. 25 is an exploded view of the side panels 66 and 68. Preferably the right-side panel 66 is buffered from the vehicle bed extender 44 by a right-side panel spacer 352. Likewise, the left side panels 68 may be buffered from the vehicle bed extender 44 by a left side panel spacer 354.

Figure 26:
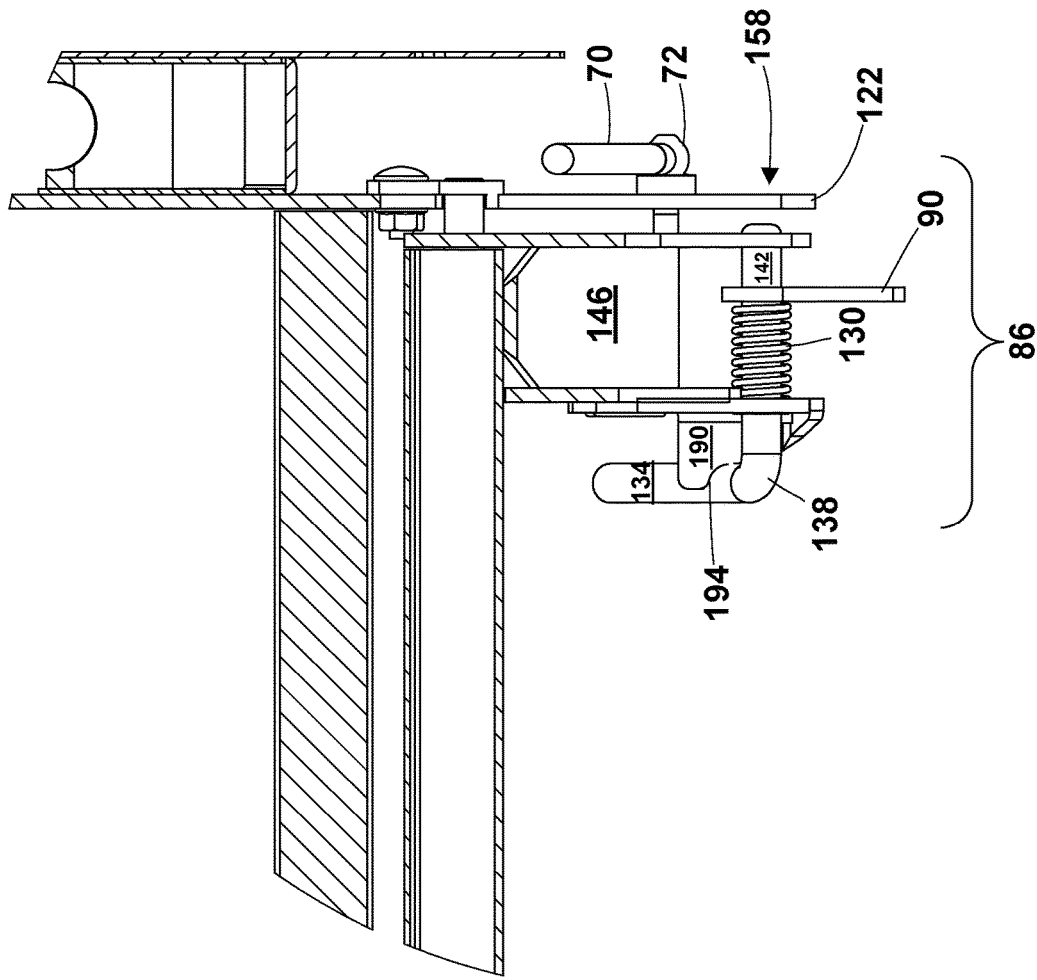

FIG. 26 is a cross-sectional view of the right locking mechanism 86.

Figure 27:
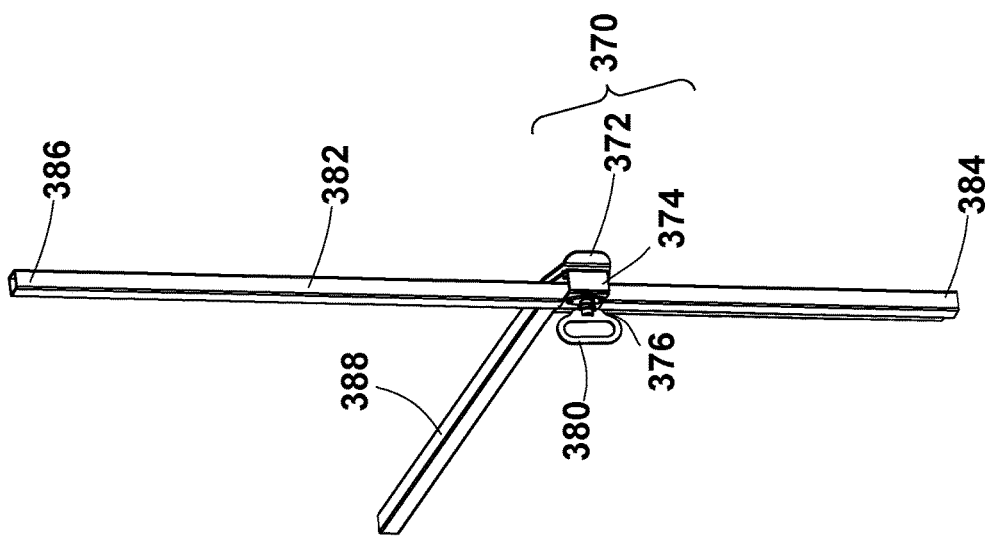

FIG. 27 is a view of another preferred embodiment of the present invention wherein the locking mechanism takes a different form. Here the right side of the ramp portion 382 is affixed to a structural bar 388 by a pull mechanism 370. Preferably the pull mechanism 370 is located between the upper portion of the right side of the ramp 386 and the lower portion of the right side of the ramp 384. Preferably the structural bar 388 terminates in a locking pin acceptor 372 which is configured to accept a locking pin 376 which is housed in a locking pin cage 374. Preferably the pull mechanism 370 can be disengaged from a locking pin acceptor 372 through the application of force to a locking pin handle 380. Preferably a spring mechanism within the locking pin cage 374 peaks locking pin 376 engaged with the locking pin acceptor 372 while force is not applied to the locking pin handle 380. When the locking pin 376 is engaged with the locking pin acceptor 372, the device 30 is kept in the first closed position. When the locking pin 376 is not engaged with the acceptor 372, the device 30 may be moved into the second closed position.

DETAILED DESCRIPTION OF THE PREFERRED EMBODIMENT

Certain terminology is used in the following description for convenience only and is not limiting. The words "right," "left," "up," and "down" designate the directions as they would be understood by a person facing in the viewing direction unless specified otherwise. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "outer" and "inner" refer to directions away from and toward, respectively, the geometric center of the specified element, or, if no part is specified, the geometric center of the device 30. The terms "downward" and "upward refers to directions above and below the center of the device 30, respectively, unless specified otherwise. The terms "forward" and "front" refer to a direction in front of the case 30 and the term "rear" refers to a direction behind the device 30. The terms "axial" and "radial" refer to directions towards and away from the center of the case respectively. The term "generally aligned" refers to objects which functionally form a single surface such that for low precision mechanical applications they can be treated as uniform. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The language "at least one of 'A', 'B', and 'C'," as used in the claims and in corresponding portions of the specification, means "any group having at least one 'A'; or any group having at least one 'B'; or any group having at least one 'C';—and does require that a group have at least one of each of 'A', 'B', and 'C'." More specifically, the language 'at least two/three of the following list' (the list itemizing items '1', '2', '3', '4', etc.), as used in the claims, means at least two/three total items selected from the list and does not mean two/three of each item in the list. The term "transverse," as used in the specification, means "situated or extending across something, such as along a side of an object." The term "interior", as used in the claims and corresponding portions of the specification means the area proximate to the center of the invention. The term "exterior" similarly defines the area not in proximity to the center of the invention. Additionally, the words "a" and "one" are defined as including one or more of the referenced items unless specifically stated otherwise. The terminology includes the words specifically mentioned above, derivatives thereof, and words of similar import.

Referring to FIGS. 1-27, a folding convertible ramp device according to preferred embodiments of the present invention is shown. Multiple preferred implementations of the preferred embodiments of the present invention will be described below (alone or in combination with various embodiments of the ramp device). Unless otherwise stated, similar structure or functions described in conjunction with the below devices preferably, but not necessarily, operate in a generally similar manner to that described elsewhere in this application.

One preferred embodiment of the present invention is directed to a device for transporting objects to and from a vehicle bed 34 (herein referred to also as a "cargo bed" and a "bed") and securing them in the bed 34 during transport in a vehicle 32. Those of ordinary skill in the art will appreciate from this disclosure that the term "object" as used in the specification and the claims, means "a physical object which can be transported in a vehicle" without departing from the scope of the present invention.

Alternatively, the present invention is directed to a device for extending a vehicle bed with a vehicle bed extender 44 (herein referred to also as the "chassis major surface" or "cargo bed extender") which may be configured to provide a sloped surface at the rear of the vehicle bed 34 which overhangs the vehicle 32 and is connected via a chassis 42 with a vehicle hitch attachment 84 to a standard vehicle hitch 94 (herein referred to also as a "hitch"). The chassis major surface 44 of the present invention is designed to accommodate the weight of an object stored in the vehicle bed 34 during both the transport of the object, or the loading and unloading of the object from the vehicle bed 34.

Alternatively, the present invention is directed to a device for transporting an object from a "support surface" (herein referred to also as the "ground") to a vehicle bed 32 with a convertible folding ramp body 30 (herein referred to also as a "device", a "folding ramp device", or a "ramp") which is configured to have a first closed position and a second open position (herein referred to also as the "extended position"). Preferably the device 30 has a ramp portion 36 (herein referred to also as the "ramp") which is further comprised of a first ramp portion 38 and a second ramp portion 40. The first ramp portion 38 may be configured to connect to the vehicle bed extender 44 at its proximal end 48 and to the second ramp portion at its distal end 50. The second ramp portion 40 may be configured to connect to the first ramp portion 38 at its proximal end 56 and may have at its distal end 58, at least one handle 64. Preferably the first ramp portion 38 has a first ramp major surface 52 and the second ramp portion 40 has a second ramp major surface 60, which when the device in the extended position, join with the chassis major surface 44 to form a single ramp surface from the ground to the vehicle bed 34.

Referring now to FIGS. 1-4, the folding ramp body 30 is depicted in the first closed position and engaged with a vehicle 32. Preferably the vehicle bed extender 44 provides a continuous surface with the vehicle bed 34. The extended cargo area 34 may be secured at the sides with a right-side panel 66 and a left side panel 68. Preferably the folding ramp device 30 comprises a chassis 42, a vehicle bed extender 44, and a ramp 36. More preferably the ramp 36 is comprised of a first ramp section 38 and a second ramp section 40. Preferably the first ramp section 38 is connected to the vehicle bed extender 44 at the first ramp proximal end 48 and the second ramp section 40 at the first ramp distal end 50. The second ramp section 40 may be connected to the first ramp section 38 at the second ramp proximal end 56. Preferably no portion of the folding ramp device 30 adjacently overlays nor lays upon any portion of the bed floor of the vehicle when the device 30 is engaged with a vehicle 32. Probably when the device the first ramp section 38 and the second section 40 are both slightly curved, have similar curvature, and are positioned in a generally parallel manner to one another.

Still referring to FIGS. 1-4, preferably the folding ramp device 30 comprises a ramp body 36 which is composed of at least two ramp portions. One of ordinary skill in the art will appreciate from this disclosure that the ramp body 36 may be composed of any number of ramp portions, sections, or subcomponents without departing from the scope of the present invention. These portions may be configured to interlock with one another in at least one closed storage/transport position whereby they do not impede the motion of the vehicle 32 to which the device is attached. One of ordinary skill in the art will appreciate from this disclosure that the device may have any number of positions or modes without departing from the scope of the present invention. These storage/transport positions may be further configured to allow the ramp 36 to occupy less horizontal planar space in the rear of the vehicle than the ramp 36 would if the device were not in the storage/transport position. Preferably this occurs through a mechanism such as folding, telescoping, collapsing, or separably removing components. One of ordinary skill in the art will appreciate from this disclosure that any mechanism which allows a ramp body 36 to occupy less space behind the rear of the vehicle in one position, and enough space to accommodate a functional ramp 36 in another position, does not part from the scope of the present invention.

Still referring to FIGS. 1-4, preferably the device is kept in a first closed position during the operation of the vehicle through some locking mechanism 86, 98. One of ordinary skill in the art will appreciate from this disclosure the device may utilize none, one, or a plurality of locking mechanisms without departing from the scope of the present invention. This locking mechanism 86 may be manually operated through the application of manual force to some locking component 86 on the device 30 thereby allowing the device to be moved from a first closed position to a second open position. One of ordinary skill in the art will appreciate from this disclosure that the locking mechanism 86 may be mechanical, electrical, pneumatic, adhesive, hydraulic, magnetic, or any combination thereof, without departing from the scope of the present motion. Further, one of ordinary skill in the art will appreciate from this disclosure that the operation of the locking mechanism by the user may occur manually, automatically, or remotely without departing from the scope of the present invention.

Still referring to FIGS. 1-4, preferably the device 30 is engaged with the vehicle 32 via a vehicle hitch attachment 84 (herein referred to also as a "hitch insert") which is engaged with the vehicle hitch 94. Preferably, this hitch insert is configured to resist downward torsional force applied by objects on the ramp 36 and or chassis 42. The device 30 may also be engaged with the vehicle 32 via one or more bumper supports 82, 83 which are configured to transfer downward force on the ramp 36 and vehicle bed extender 44 to the vehicle bumper 92. The bumper supports 82, 83 may also be configured to allow the vehicle bed extender 44 to align directly with the rear of the vehicle bed 34 such that vehicles with varying discrepancies in height between the vehicle hitch 94 and vehicle bed 34, are compatible with the device 30. One of ordinary skill in the art will appreciate from this disclosure that the device may be configured to be attached to or otherwise be engaged with the vehicle 32 through any mechanism or location on the vehicle 32, or combination thereof, without departing from the scope of the present invention. Accordingly, in another aspect, the present invention may be engaged with the vehicle 32 via physical means such as welding, alternative temporary connections such as mounts, pins, screws, bolts, or the like in the vehicle bed, or be otherwise held in place through forces such as friction or magnetic attraction.

Referring now to FIGS. 5, 6, 10-12, 17, 21, & 22, preferably the device 30 resists torsional force and is otherwise held in place primarily by the vehicle hitch attachment 94, which is transferred force from the vehicle bed extender 44 and the ramp 36, by subcomponents of the chassis 42, which may include a chassis spreader 112 (herein referred to also as a "chassis support bracket" and a "bed") which is braced by a right chassis brace 108 and a left chassis brace 110. One of ordinary skill in the art will appreciate from the present invention that any mechanism which directs force from the ramp body 36 toward structural elements may be used in lieu of, or in combination with, a braced chassis body 42 without the departing from the scope of the present invention. The chassis spreader 112 may be configured to engage with the vehicle hitch attachment 84 via a vehicle hitch adjustment plate 252 (herein referred to also as a "receiver hood plate") which may be configured to have variable grooves 254, 256, 258, 260 (herein referred to also as "guide grooves"), thereon which allow for longitudinal adjustment, in relationship to the hitch 94, of the vehicle bed extender 44 such that the device 30 may be compatible with vehicles 32 that have varying horizontal differences between the distal ends of their hitches 94 and the distal ends of their vehicle beds 34. One of ordinary skill in the art will appreciate the present disclosure that any adjustable mechanism which facilitates the compatibility of the device 30 with differently shaped vehicles 32 may be included or omitted without departing from the scope of the present invention.

Still referring to FIGS. 5, 6, 10-12, 17, 21, & 22, preferably the chassis spreader 112 is engaged with the vehicle bed extender 44 on the right side via a right height adjustment plate 104, and on the left side with a left height adjustment plate 106 onto which may be bored height adjustment holes 118 and left height adjustment holes 120 respectively. These plates 104, 106 may be configured to connect to a right central riser 114 and a left central riser 116 which may be protrusions that project downwardly from the vehicle bed extender 44. The adjustment holes 118, 120 may be configured to allow the vehicle bed extender 44 to align directly with the rear of the vehicle bed 34 such that vehicles with varying discrepancies in height between the vehicle hitch 94 and vehicle bed 34, are compatible with the device 30. One of ordinary skill in the art will appreciate from this disclosure that the device may be configured to be attached to or otherwise engaged with the vehicle 32 through any mechanism or location on the vehicle 32, or combination thereof, without departing from the scope of the present invention. Further, one of ordinary skill in the art will appreciate from this disclosure that the chassis 42 and the vehicle bed extender 44 may be connected through any mechanism such as bolts, pins, screws, or welds without departing from the scope of the present invention.

Now referring to FIGS. 6, 7, 8, 9, 11, & 12, preferably the device 30 is configured to be movable from a first closed position to a second extended position wherein the first ramp section 38, and the second ramp section 40 join at their respective distal and proximal ends. In the second extended position, the first ramp major surface 52, the second ramp major surface 60, and the chassis major surface 46 may join to form one continuous ramp surface extending from the support surface to the cargo bed 34. Preferably, this is accomplished by rotating a first ramp section 38 about a first axis of rotation 54 (herein referred to also as a "first axis"), and a second ramp section 40 about the second axis of rotation 62 (herein referred to also as a "second axis"). One of ordinary skill in the art will appreciate from this disclosure that the device 30 may be moved between any position through the manipulation of any components about any number of axes or through or any other mechanism which allows components to move about one another, or be separably engaged and disengaged, without departing from the scope of the present action. Preferably when the device 30 is engaged with a vehicle 32, the chassis 42 is configured such that the first axis 54 is spaced from and does not overlay the vehicle bed. Preferably, neither the first ramp section 38 nor the second ramp section 40, are positioned over or rest on the vehicle bed 34.

Still referring to FIGS. 6, 7, 8, 9, 11, & 12, the lowering of the ramp 36 may be facilitated by a right biasing member 70 and a left biasing member 76 disposed thereon. One of ordinary skill in the art will appreciate from this disclosure that the biasing members may resist downward gravitational force through any mechanism, such as pneumatics, hydraulics, gearing, springs, or magnets, without departing from the scope of the present invention. These biasing members 70, 76 may be connected at their respective proximal ends 72, 78 to the right support flange 122 and the left support flange 124 of the vehicle bed extender 44. These biasing members 70, 76 may be connected at their respective distal ends 74, 80 to the first ramp section 38. One of ordinary skill in the art will appreciate on this disclosure that no biasing members, or any number of biasing members, may be used with the device 30 without departing from the scope of the present invention. Similarly, the biasing members may be configured to be attached to any portion of the device without departing from the scope of the present invention.

Now Referring to FIGS. 13 and 24, the device 30 is preferably held in the first closed position by a right locking mechanism 86 and a left locking mechanism 98 which mirrors it. Preferably these mechanisms 86, 98 are disposed on the right and left undersides of the first ramp section 48. Preferably the right locking mechanism 86 is housed in an elbow section extending outwardly and in a different direction from the first ramp section major surface 52. Preferably this elbow section is comprised of a right exterior locking ramp flange 202, a right interior locking ramp flange 198, and a right locking plate 234. Preferably defined through the elbow section is a lock rod receiving bore which may be comprised of a right exterior locking bar guide 154 in the right exterior locking ramp flange 198 and a right interior locking bar guide 150 in the right locking plate 234. This lock rod receiving bore may house a lock rod (herein referred to also as a "right locking bar") which may be comprised of a right locking bar handle 134 (herein referred to also as a "second lock rod portion"), a right locking bar elbow 138, a right reset spring 130, a right reset flipper 90 (herein referred to also as a "finger plate"), and a right locking bar engaging portion 142 (herein referred to also as a "first lock rod portion"). Preferably when the device 30 is in the first closed position and the mechanism 84 is in the first locked position, the first portion of the lock rod 142 may be configured to be engaged with the right support flange lock receiver 158 which may be a hole in the right support flange 122 of the chassis 42. When the first portion of the lock rod 142 is engaged with the chassis 42 in this fashion, the mechanism 84 is in the first locked position which may prevent the first ramp section 38 from being rotated about the first rotational axis 54, which in turn may keep the device 30 in the first closed position. One of ordinary skill in the art will appreciate from this disclosure that the device may utilize any kind of locking mechanism disposed on any portion of the ramp, chassis, or otherwise without departing from the scope of the present invention. Further, the device may incorporate any number of locking mechanisms without departing from the scope of the present invention.

Now Referring to FIGS. 14 and 24, wherein the device 30 is in the first closed position, the mechanism 84 may be moved from a first locked position to a second unlocked position, depicted in FIG. 14, through the application of downward force on the right locking bar handle 134. As the handle is depressed it may pass over the right locking handle spacer 190, which is wider towards the rear, which may in turn cause the entire lock rod 88 to move inwardly, retracting the right locking bar engaging portion 142 from the right support flange lock receiver 158. The handle 134 can continue to be depressed until it settles into the right locking handle spacer receiver 194. Once the first portion of the lock rod 142 is disengaged with the chassis 42 and the handle 134 is the spacer receiver 158, the mechanism 84 has been transitioned into the second unlocked position and may no longer be preventing the first ramp section 38 from being rotated about the first rotational axis 54. One of ordinary skill in the art will appreciate from this disclosure that any mechanism which causes the locking bar 88 to be disengaged with the chassis may be utilized in conjunction or in lieu of the spacer 190 without departing form the scope of the present invention.

Now Referring to FIGS. 15 and 16 when the locking mechanism 86 is in the first unlocked position, the right reset spring 130 may apply force against the right reset flipper 90, however the locking bar 88 may be prevented from returning to its original position by the right locking handle receiver 190 as depicted in FIG. 15. Preferably, when the device 30 is a transitioned from the first closed position to the second open position the reset flipper 90 makes contact with the right reset pin 210 which may apply force to the handle 134 of the handle receiver 194 and cause it to rotate back towards its original position as depicted in FIG. 16. Preferably, when the locking bar 88 has returned to its original position but the ramp is still in the second extended position, the lock rod engaging portion 142 will be pressed against the right support flange 122 of the chassis 42 as a result of the force of the spring 130 on the flipper 90. Preferably when the ramp is returned to the first closed position while the lock rod engaging portion 142 is pressed against the flange 122, the lock rod engaging portion 142 may eventually return to the right support flange lock receiver 158 thereby engaging with the chassis 42. This engagement with the chassis 42 may return the locking mechanism 86 to the first locked position which, subsequently, may prevent the device 30 from being moved from the first locked position to the second unlocked position. One of ordinary skill in the art will appreciate from the present disclosure that any mechanism which may automatically reengage the locking mechanism upon the return of the ramp from a second unlocked position to the first locked position may be utilized without departing from the scope of the present invention.

Still referring to FIGS. 15 and 16, in another preferred embodiment of the present invention, the return of the lock rod engaging portion 142 into the right support flange lock receiver 158, may be facilitated by the right biasing member 70.

Referring now to FIGS. 18 & 21, preferably the hitch insert has an abutment wedge 358 on its top surface. This wedge 358 may be configured to rest against the outside surface of the vehicle hitch 94 when the hitch insert 84 is telescopically engaged with the hitch 94. Preferably an elongated passage, herein referred to as a vehicle hitch pin slot 264, is defined on either side of the hitch insert 84. The hitch inserts 84 is preferably hollow such that it can accommodate a tensioning bolt (herein referred to also as a "tension rod"). This rod may also have a passage defined therethrough herein referred to as a vehicle hitch tension bolt hole 248. Preferably the vehicle hitch 94, the tension bolt hole 248, and the vehicle hitch pin slot 264, are all aligned so that when the hitch attachment 84 is inserted into the vehicle hitch 94, a standard hitch pin can be secured through them all 94, 248, 264. Preferably, this enables a bolt eye (herein referred to also as a "tensioning nut") to be screwed onto the threaded end 262 of the tensioning bolt 246 which protrudes from the rear of the body of the hitch insert 84. Preferably the rear of the hitch insert 84 has a space only large enough for the tension bolt 246 to pass, thereby allowing the edges of the tensioning nut 262 to abut the rear wall of the hitch insert body 84. More preferably, through the continual screwing of the tensioning nut 262 onto the tensioning rod 246, the hitch insert 84 may be telescopically pulled further into the vehicle hitch 94 creating a closer connection between the device 30 and the vehicle 32. Additionally, this further telescoping may cause the abutment wedge 358 to be forced against the outside wall of the hitch insert 84, which may in turn cause vertical adjustment of the device 30 and provide for additional stability. One of ordinary skill in the art will appreciate from the present disclosure that any mechanism which facilitates in stronger, closer, and more stable connection between a vehicle hitch 94 and a vehicle hitch attachment 84 may be incorporated or omitted without departing from the scope of the present invention.

Referring now to FIG. 27, in another preferred embodiment the present invention may be directed towards a pull mechanism 370. Preferably this mechanism allows the right side of ramp 386 to be secured in a first closed position by a locking pin 376 which is engaged with a locking pin acceptor 372 by a spring. The application of force on the locking pin handle 380 causes the locking pin 376, housed within a locking pin cage 374, to be removed from the locking pin acceptor 372 converting the mechanism 370 from a first locked position to a second unlocked position. In the second unlocked position the right side of the ramp 386 can move independently of the right structural bar 388, thereby allowing the ramp to be moved to a second open position. Preferably, the mechanism 370 is reversible and manual force on the ramp will cause the pin 376 to abut the outside of the acceptor 372, temporarily retracting the pin 376 until the pin 376 reaches a position within the acceptor 372 where the spring forces the pin 376 back into position, thereby returning the mechanism 370 to the first locked position. One of ordinary skill in the art will appreciate from the present disclosure that the device 30 may be secured in a first closed position, or any other position, through use of mechanisms 84, 98 illustrated in FIGS. 13, 14, 15, 16, 24, &

26, or the pull mechanism 370 illustrated in FIG. 27, any other locking mechanism, or combination thereof, without departing from the scope of the present invention.

FIG. 27 is a view of another preferred embodiment of the present invention wherein the locking mechanism takes a different form. Here the right side of the ramp portion 382 is affixed to a structural bar 388 by a pull mechanism 370. Preferably the pull mechanism 370 is located between the upper portion of the right side of the ramp 386 and the lower portion of the right side of the ramp 384. Preferably the structural bar 388 terminates in a locking pin acceptor 372 which is configured to accept a locking pin 376 which is housed in a locking pin cage 374. Preferably the pull mechanism 370 can be disengaged from a locking pin acceptor 372 through the application of force to a locking pin handle 380. Preferably a spring mechanism within the locking pin cage 374 peaks locking pin 376 engaged with the locking pin acceptor 372 while force is not applied to the locking pin handle 380. When the locking pin 376 is engaged with the locking pin acceptor 372, the device 30 is kept in the first closed position. When the locking pin 376 is not engaged with the acceptor 372, the device 30 may be moved into the second closed position.

The device 30 is preferably made of a tough, resilient, and weather resistant material such as metal. However, those of ordinary skill in the art will appreciate that the materials from which the device 30 is constructed can be varied without departing from the scope of the present invention. For example, the device 30 can be made of strong, weather resistant, inflexible material such as steel. By way of further example, the device 30 can be made of a robust, lightweight, easily manufactured, material such as aluminum. By way of further example, the device 30 can be made of a durable and resilient polymer such as polyvinyl chloride. By way of further example still, the device can be made of a pliant, not opaque, somewhat rigid material that can be injection molded such as plastic or polymer. By way of an alternative example, the case system can also be made by a thermoplastic polymer such as polycarbonate that is, strong and weather resistant.

While the preferred embodiment is disclosed above, those of ordinary skill in the art will appreciate from this disclosure that the structure of the device can be varied without departing from the scope of the present invention. For example, one of ordinary skill in the art will appreciate from this disclosure that device elements, as well as materials, shapes and dimensions of device elements, as well as methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed, described in the specification, and/or shown in the figures. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention.

What is claimed is:

1. A folding ramp device configured for use with a vehicle having a vehicle bed, the folding ramp device, comprising:
    a chassis configured for engagement with the vehicle, the chassis having a vehicle bed extender configured to be generally aligned with the vehicle bed when the chassis is engaged with the vehicle, the vehicle bed extender having a chassis major surface configured to face in a first direction, oriented generally away from the ground, when the chassis is engaged with the vehicle so as to provide vertical support to objects thereon;
    a ramp body attached to the chassis and moveable between a first, closed position and a second, extended position, the ramp body comprising:
        a first ramp section having a first ramp proximal end and a first ramp distal end, the first ramp proximal end being connected to the chassis for pivotal rotation about a first axis, the first ramp section having a first ramp section major surface configured to support objects thereon;
        a second ramp section having a second ramp proximal end and a second ramp distal end, the second ramp proximal end being pivotally connected to the first ramp distal end about a second axis, the second ramp section having a second ramp section major surface configured to support objects thereon;
        wherein when the ramp body is in the first, closed position: (1) the first ramp section extends generally in the first direction from the chassis major surface; and
        (2) the second ramp section is positioned adjacent to the first ramp section such that the first ramp section major surface and the second ramp section major surface are oriented generally oppositely; and
    when the ramp body is in the second, extended position: the chassis major surface, the first ramp section major surface, and the second ramp section major surface are aligned to generally form a single ramp surface;
    wherein the folding ramp device is configured to engage a vehicle hitch of the vehicle, the chassis major surface having a chassis proximal end configured for placement generally adjacent to the vehicle bed;
    a hitch attachment disposed on the chassis and configured to engage the vehicle hitch, the hitch attachment configured to support the folding device and any objects thereon, the hitch attachment being configured such that when the folding device is attached to the truck and the hitch attachment is engaged with the vehicle hitch all resistance to torsional force attempting to pivot the chassis major surface relative to the vehicle bed and to move the chassis proximal edge upwardly and away from the vehicle bed is provided by the hitch attachment, the hitch attachment includes a tension mechanism configured to maintain a compressive force between the vehicle hitch and that hitch attachment
    a lock mechanism disposed on the folding device and configured to secure the first ramp section in the first, closed position automatically when the first ramp section is moved into the first, closed position; and
    a biasing member positioned secured to the chassis and the ramp body, the biasing member acting against gravitational force on the ramp body during movement from the first, closed position toward the second, extended position.

2. The folding ramp device of claim 1, wherein the folding ramp device does not adjacently overlay nor lay upon any portion of the bed floor when positioned on the cargo bed of the vehicle.

3. The folding ramp device of claim 1, wherein when the folding ramp device is engaged with the vehicle the chassis is configured such that the first axis is spaced from and not located over the vehicle bed; and wherein when the folding ramp device is engaged with the vehicle and in the first closed position the first ramp section and the second ramp section are not positioned above the vehicle bed.

4. The folding ramp device of claim 1, wherein when the ramp body is in the first, closed position the first ramp section major surface is convex when viewing the first ramp section major surface in a second direction from the chassis and looking toward the ramp body and generally orthogonal to the first ramp section major surface; wherein when the ramp body is in the first, closed position the second ramp section is concave when viewed in a third direction looking toward the second ramp section with the chassis located on a generally opposite side of the ramp body from the second ramp section major surface.

5. The folding ramp device of claim 1, wherein when the ramp body is in the first, closed position both the first ramp section and the second ramp section are curved and positioned in a generally parallel manner.

6. The folding device of claim 5, wherein the first ramp section and the second ramp section have generally the same radius of curvature.

7. The folding ramp device of claim 1, further comprising a support mechanism disposed on chassis and configured to contact a side of a vehicle bumper of the vehicle generally opposite from the vehicle hitch when the folding device is fully engaged with the vehicle hitch.

8. The folding ramp device of claim 7, wherein the only contact between the vehicle and the folding ramp device is between the folding ramp device and the vehicle hitch and also between the folding ramp device and the vehicle bumper.

9. The folding device of claim 8, further comprising a plurality side panels attached to the chassis each of which extend toward a separate side of the vehicle bed.

10. The folding device of claim 7, further comprising: wherein the hitch attachment further comprises
   a hitch insert configured for insertion into the vehicle hitch, the hitch insert defining an elongated passage therethrough configured to receive a hitch pin that extends laterally through the vehicle hitch and through the hitch insert so as to be positioned in the elongated slot of the hitch insert such that the hitch insert can be telescopically withdrawn inwardly into the vehicle hitch until the chassis is securely positioned against the vehicle;
   wherein the tension mechanism is a tensioning bolt having a bolt eye configure to receive the hitch pin therethrough while the tension mechanism is located within the hitch insert;
   the hitch insert an abutment wedge thereon which is configured to abut an end of the vehicle hitch while the chassis is being securely positioned against the vehicle;
     a receiver hood plate located on the hitch insert, the receiver hood plate defining a plurality of guide grooves therethrough;
     a chassis support bracket slidably engaged with the plurality of guide grooves in the receiver hood plate such that the position of the chassis support bracket along a longitudinal hitch axis can be adjusted prior to positionally fixing the chassis support bracket thereto; and
     wherein the chassis support bracket is engaged with the chassis on opposing lateral sides of the hitch insert to provide stability to the chassis; and
   the locking mechanism, further comprising:
     wherein the first ramp section comprises an elbow section extending outwardly from the first axis in a direction different from the first ramp section major surface, the elbow section defining a lock rod receiving bore such that when the first ramp section is rotated about the first axis, the lock rod receiving bore is also rotated about the first axis;
     a lock rod slidably engaged with the chassis and configured to engage the lock rod receiving bore when the first ramp section is in the first, closed position, the lock rod, comprising:
       a first lock rod portion defining a lock rod axis and having a finger plate thereon;
       a second lock rod portion extending radially outwardly from the lock rod axis, wherein the finger plate extends radially outwardly from the lock rod axis in a different direction from the second lock rod portion; and
       a biasing member position about the first lock rod portion and located between the finger plate and the second rod portion;
     the locking mechanism being configured such that rotation of the second lock portion about the lock rod axis unlocks the first ramp section from being positionally secured in the first, closed position; and
     a reset bar located on the chassis and positioned such that when the first ramp section is approaching the second, extended position the finger plate abuts the reset bar and the biasing member will automatically lock the first ramp section in the first closed position when the first ramp section is returned to the first closed position.

11. The folding ramp device of claim 1, wherein when the ramp body is in the second, extended position: the chassis major surface, the first ramp section major surface, and the second ramp section major surface are aligned to generally form the single ramp surface, when the ramp body is in the second, extended position and viewed in cross section, as taken orthogonally to the single ramp surface, the first ramp section and the second ramp section generally form an S-shape, the S-shape is formed by the second ramp section being concave and opening away from the ground and the first ramp section being convex and extending away from the ground, the single ramp surface being configured to prevent bottoming out of machinery rolled thereover.

12. A folding ramp device configured for use with a vehicle having a vehicle bed, a vehicle bumper, and a vehicle hitch, the folding ramp device, comprising:
   a chassis configured for engagement with the vehicle, the chassis having a vehicle bed extender configured to be generally aligned with the vehicle bed when the chassis is engaged with the vehicle, the vehicle bed extender having a chassis major surface configured to face in a first direction, oriented generally away from the ground, when the chassis is engaged with the vehicle so as to provide vertical support to objects thereon;
   a ramp body attached to the chassis and moveable between a first, closed position and a second, extended position, the ramp body comprising:
     a first ramp section having a first ramp proximal end and a first ramp distal end, the first ramp proximal end being connected to the chassis for pivotal rotation about a first axis, the first ramp section having a first ramp section major surface configured to support objects thereon;

a second ramp section having a second ramp proximal end and a second ramp distal end, the second ramp proximal end being pivotally connected to the first ramp distal end about a second axis, the second ramp section having a second ramp section major surface configured to support objects thereon;

wherein when the ramp body is in the first, closed position: the chassis major surface, the first ramp section major surface, and the second ramp section major surface are unaligned and do not generally form a single ramp surface;

wherein when the ramp body is in the second, extended position: the chassis major surface, the first ramp section major surface, and the second ramp section major surface are aligned to generally form the single ramp surface; and wherein folding ramp device is configured such that when the folding ramp device is installed on the vehicle, the only contact between the vehicle and the folding ramp device is between the folding ramp device and the vehicle hitch and also between the folding ramp device and the vehicle bumper wherein the chassis major surface having a chassis proximal end configured for placement generally adjacent to the vehicle bed, the folding device further comprising a hitch attachment disposed on the chassis and configured to engage the vehicle hitch, the hitch attachment configured to support the folding device and any objects thereon, the hitch attachment being configured such that when the folding device is attached to the truck and the hitch attachment is engaged with the vehicle hitch all resistance to torsional force attempting to pivot the chassis major surface relative to the vehicle bed and to move the chassis proximal edge upwardly and away from the vehicle bed is provided by the hitch attachment;

wherein the hitch attachment includes a tension mechanism configured to maintain a compressive force between the vehicle hitch and that hitch attachment;

a lock mechanism disposed on the folding device and configured to secure the first ramp section in the first, closed position automatically when the first ramp section is moved into the first, closed position;

a biasing member positioned secured to the chassis and the ramp body, the biasing member acting against gravitational force on the ramp body during movement from the first, closed position toward the second, extended position; and a support mechanism disposed on chassis and configured to contact a side of a vehicle bumper of the vehicle generally opposite from the vehicle hitch when the folding device is fully engaged with the vehicle hitch.

13. The folding ramp device of claim 12, wherein when the ramp body is in the second, extended position: the chassis major surface, the first ramp section major surface, and the second ramp section major surface are aligned to generally form the single ramp surface, when the ramp body is in the second, extended position and viewed in cross section, as taken orthogonally to the single ramp surface, the first ramp section and the second ramp section generally form an S-shape, the S-shape is formed by the second ramp section being concave and opening away from the ground and the first ramp section being convex and extending away from the ground, the single ramp surface being configured to prevent bottoming out of machinery rolled thereover.

14. The folding device of claim 12, further comprising: wherein the hitch attachment further comprises:

a hitch insert configured for insertion into the vehicle hitch, the hitch insert defining an elongated passage therethrough configured to receive a hitch pin that extends laterally through the vehicle hitch and through the hitch insert so as to be positioned in the elongated slot of the hitch insert such that the hitch insert can be telescopically withdrawn inwardly into the vehicle hitch until the chassis is securely positioned against the vehicle;

wherein the tension mechanism is a tensioning bolt having a bolt eye configure to receive the hitch pin therethrough while the tension mechanism is located within the hitch insert;

the hitch insert an abutment wedge thereon which is configured to abut an end of the vehicle hitch while the chassis is being securely positioned against the vehicle;

a receiver hood plate located on the hitch insert, the receiver hood plate defining a plurality of guide grooves therethrough;

a chassis support bracket slidably engaged with the plurality of guide grooves in the receiver hood plate such that the position of the chassis support bracket along a longitudinal hitch axis can be adjusted prior to positionally fixing the chassis support bracket thereto; and wherein the chassis support bracket is engaged with the chassis on opposing lateral sides of the hitch insert to provide stability to the chassis; and the locking mechanism, further comprising:

wherein the first ramp section comprises an elbow section extending outwardly from the first axis in a direction different from the first ramp section major surface, the elbow section defining a lock rod receiving bore such that when the first ramp section is rotated about the first axis, the lock rod receiving bore is also rotated about the first axis;

a lock rod capable of sliding within the lock rod receiving bore, the lock rod being configured to engage the chassis when the first ramp section is in the first, closed position, the lock rod, comprising a first lock rod portion defining a lock rod axis and having a finger plate thereon;

a second lock rod portion extending radially outwardly from the lock rod axis, wherein the finger plate extends radially outwardly from the lock rod axis in a different direction from the second lock rod portion; and a reset spring positioned about the first lock rod portion and located between the finger plate and the second rod portion;

the locking mechanism being configured such that rotation of the second lock portion about the lock rod axis unlocks the first ramp section from being positionally secured in the first, closed position; and a reset bar located on the chassis and positioned such that when the folding device is approaching the second, extended position the finger plate abuts the reset bar and the reset spring will automatically lock the first ramp section in the first closed position when the first ramp section is returned to the first closed position.

15. The folding ramp device of claim 12, wherein the folding ramp device does not adjacently overlay nor lay upon any portion of the bed floor when positioned on the cargo bed of the vehicle.

16. The folding ramp device of claim 12, wherein when the folding ramp device is engaged with the vehicle the chassis is configured such that the first axis is spaced from and not located over the vehicle bed; and wherein when the folding ramp device is engaged with the vehicle and in the first closed position the first ramp section and the second ramp section are not positioned above the vehicle bed.

17. The folding ramp device of claim 12, wherein when the ramp body is in the first, closed position the first ramp section major surface is convex when viewing the first ramp section major surface in a second direction from the chassis and looking toward the ramp body and generally orthogonal to the first ramp section major surface; wherein when the ramp body is in the first, closed position the second ramp section is concave when viewed in a third direction looking toward the second ramp section with the chassis located on a generally opposite side of the ramp body from the second ramp section major surface.

18. The folding ramp device of claim 12, wherein when the ramp body is in the first, closed position both the first ramp section and the second ramp section are curved and positioned in a generally parallel manner.

19. The folding ramp device of claim 18, wherein the first ramp section and the second ramp section have generally the same radius of curvature.

\* \* \* \* \*